US012784491B2

(12) United States Patent
Bae et al.

(10) Patent No.: US 12,784,491 B2
(45) Date of Patent: Nov. 3, 2026

(54) DISPLAY DEVICE AND ELECTRONIC DEVICE USING THE SAME

(71) Applicant: Samsung Display Co., Ltd., Yongin-si (KR)

(72) Inventors: Kwang Soo Bae, Yongin-si (KR); Jung Woo Park, Yongin-si (KR); Tae Kyung Ahn, Yongin-si (KR); Goe En Jeong, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 19/238,223

(22) Filed: Jun. 13, 2025

(65) Prior Publication Data

US 2026/0030918 A1 Jan. 29, 2026

(30) Foreign Application Priority Data

Jul. 25, 2024 (KR) ........................ 10-2024-0098802

(51) Int. Cl.
*G06V 40/13* (2022.01)
*G06F 3/044* (2006.01)
*G09G 3/32* (2016.01)

(52) U.S. Cl.
CPC ........... *G06V 40/1318* (2022.01); *G09G 3/32* (2013.01); *G06F 3/044* (2013.01); *G09G 2300/0804* (2013.01); *G09G 2300/0852* (2013.01); *G09G 2320/0693* (2013.01); *G09G 2354/00* (2013.01); *G09G 2360/148* (2013.01)

(58) Field of Classification Search
None
See application file for complete search history.

(56) References Cited

U.S. PATENT DOCUMENTS

| | | | | |
|---|---|---|---|---|
| 8,492,728 B2 | | 7/2013 | Antonuk | |
| 10,931,859 B2 * | | 2/2021 | Bhat | G06V 40/1318 |
| 2006/0244693 A1 * | | 11/2006 | Yamaguchi | G02F 1/13338 345/76 |
| 2010/0220075 A1 * | | 9/2010 | Kuo | G06F 3/0446 324/661 |
| 2011/0043487 A1 * | | 2/2011 | Huang | G09G 3/3233 315/32 |
| 2012/0001878 A1 * | | 1/2012 | Kurokawa | G09G 3/2003 345/204 |
| 2012/0188207 A1 * | | 7/2012 | Usukura | G09G 3/3648 345/175 |

(Continued)

*Primary Examiner* — Dorothy Harris
(74) *Attorney, Agent, or Firm* — Womble Bond Dickinson (US) LLP

(57) ABSTRACT

A display device includes: a display panel having an image display area including image display pixels, infrared (IR) light-emitting pixels, and light-sensing pixels; a display scan driver to drive the image display pixels and the IR light-emitting pixels to emit light; a light-sensing scan driver to drive the light-sensing pixels to sense light; and a main driver circuit to receive first and second light-sensing signals through first and second light-sensing lines connected to the light-sensing pixels. Each of the light-sensing pixels includes at least two photo-detecting elements spaced from each other, and the first and second light-sensing lines are to transmit the first and second light-sensing signals generated from the at least two photo-detecting elements.

15 Claims, 10 Drawing Sheets

(56) References Cited

U.S. PATENT DOCUMENTS

| | | | | |
|---|---|---|---|---|
| 2015/0364107 | A1* | 12/2015 | Sakariya | G06F 3/042 345/82 |
| 2019/0004644 | A1* | 1/2019 | Yao | G06F 3/042 |
| 2019/0065717 | A1* | 2/2019 | Won | G06V 40/1365 |
| 2021/0109636 | A1* | 4/2021 | Lius | G06F 3/0412 |
| 2022/0350432 | A1* | 11/2022 | Takahashi | G09F 9/30 |
| 2023/0251743 | A1* | 8/2023 | Yamazaki | G06F 3/0421 345/175 |
| 2023/0343289 | A1* | 10/2023 | Song | G06V 40/1318 |
| 2024/0138169 | A1* | 4/2024 | Kusunoki | G09G 3/3233 |

* cited by examiner

DISPLAY DEVICE AND ELECTRONIC DEVICE USING THE SAME

CROSS-REFERENCE TO RELATED APPLICATION

The present application claims priority to and the benefit of Korean Patent Application No. 10-2024-0098802, filed on Jul. 25, 2024, in the Korean Intellectual Property Office, the entire disclosure of which is incorporated by reference herein.

BACKGROUND

1. Field

Aspects of embodiments of the present disclosure relate to a display device, and electronic device using the display device.

2. Description of the Related Art

As information-oriented society evolves, various demands for display devices are ever increasing. Display devices are being employed by a variety of electronic devices, such as smart phones, digital cameras, laptop computers, table PCs, navigation devices, and smart televisions.

Recently, as mobile communications technology evolves, portable electronic devices, such as smartphones, tablet PCs, and laptop computers, are prevailing. Privacy information may be stored in the portable electronic devices. Accordingly, in order to protect the privacy information stored in the portable electronic devices, fingerprint authentication has been used to authenticate a user's fingerprint, which is biometric information. A display device may recognize and authenticate a user's fingerprint by optical, ultrasonic, capacitive sensing, and the like. For example, optical sensing may authenticate a user's fingerprint by sensing light reflected by a user's fingerprint.

As such, methods for measuring various biometric information, such as blood pressure, heart rate, heart rate variability, respiration, cardiovascular disease, and/or oxygen saturation, using the portable display devices may be desired.

The above information disclosed in this Background section is for enhancement of understanding of the background of the present disclosure, and therefore, it may contain information that does not constitute prior art.

SUMMARY

One or more embodiments of the present disclosure may be directed to a display device that may detect biometric information, while increasing an accuracy of fingerprint detection by way of improving a light sensing structure of light-sensing pixels formed in a display panel.

Some embodiments of the present disclosure may be directed to a display device, and an electronic device using the display device, that may increase an efficiency of sensing light for fingerprint detection and biometric information detection by way of disposing two photo-detecting elements in each light-sensing pixel.

However, the present disclosure is not limited to the above aspects and features, and the above and additional aspects and features will be set forth in the description that follows.

According to one or more embodiments of the present disclosure, a display device includes: a display panel having an image display area including image display pixels, infrared (IR) light-emitting pixels, and light-sensing pixels; a display scan driver configured to drive the image display pixels and the IR light-emitting pixels to emit light; a light-sensing scan driver configured to drive the light-sensing pixels to sense light; and a main driver circuit configured to receive first and second light-sensing signals through first and second light-sensing lines connected to the light-sensing pixels. Each of the light-sensing pixels includes at least two photo-detecting elements spaced from each other, and the first and second light-sensing lines are configured to transmit the first and second light-sensing signals generated from the at least two photo-detecting elements.

In an embodiment, the display panel may include: a plurality of first pixel groups, each including first to fourth display pixels among the image display pixels; a plurality of second pixel groups, each including first to third display pixels among the image display pixels, and an IR light-emitting pixel among the IR light-emitting pixels; and a plurality of third pixel groups, each including first to third display pixels among the image display pixels, and a light-sensing pixel among the light-sensing pixels.

In an embodiment, the IR light-emitting pixel may include: an infrared light-emitting element configured to emit light in an infrared wavelength range; and an infrared pixel driver configured to apply a driving current to the infrared light-emitting element. The light-sensing pixel may include: first and second photo-detecting elements as the at least two photo-detecting elements configured to detect light incident from a front side; and a detection driver configured to apply a driving current to the first and second photo-detecting elements.

In an embodiment, the light-sensing pixel may include: the at least two photo-detecting elements configured to detect light incident from a front side; and a detection driver configured to control a light-sensing timing of the at least two photo-detecting elements. The at least two photo-detecting elements may include: a first photo-detecting element configured to generate the first light-sensing signal corresponding to an amount of light incident from the front side, and output the first light-sensing signal to the first light-sensing line; and a second photo-detecting element configured to generate the second light-sensing signal corresponding to an amount of light incident from the front side, and output the second light-sensing signal to the second light-sensing line.

In an embodiment, the first photo-detecting element may have a circular shape or a polygonal shape in a plan view, and may be configured to output the first light-sensing signal corresponding to the amount of light incident from the front side to the first light-sensing line. The second photo-detecting element may have a circular shape or a polygonal shape having a larger area than that of the first light-sensing element in a plan view, and may surround around the first photo-detecting element so that the first photo-detecting element may be located in an opening at an inner center of the second photo-detecting element.

In an embodiment, the second photo-detecting element may further include an opened side of the opening at the inner center where the first photo-detecting element may be located, and the first light-sensing line electrically connected to the first photo-detecting element may overlap with the opened side of the second photo-detecting element.

In an embodiment, an area of the opened side of the second photo-detecting element may be larger than the area of the first photo-detecting element in a plan view, a width or a thickness of the second photo-detecting element in at least one direction may be equal to or greater than a gap between the first photo-detecting element and the second photo-detecting element, and the width or the thickness of the second photo-detecting element in the at least one direction may be narrower or smaller than a width, a diameter, or a radius of the first photo-detecting element.

In an embodiment, the display panel may further include a plurality of light-blocking patterns having a mesh structure. The mesh structure may be opened to the front side of light-emitting elements of the image display pixels and the front side of first photo-detecting elements of the light-sensing pixels, and may cover an area between the image display pixels and an area between the image display pixels and the light-sensing pixels.

In an embodiment, the plurality of light-blocking patterns may cover the front side of second photo-detecting elements of the light-sensing pixels, and may have openings in line with front side positions of the first photo-detecting elements, the openings having a same shape as a shape of the first photo-detecting elements in a plan view. The openings may have an area that is equal to or larger than an area of the first photo-detecting elements in a plan view, and may be smaller or narrower than an area of the opening at the inner centers of the second photo-detecting elements.

According to one or more embodiments of the present disclosure, a display device includes: display pixels in a display area of a display panel; infrared (IR) light-emitting pixels in the display area; light-sensing pixels in the display area; a display scan driver configured to drive the display pixels to emit light; a light-sensing scan driver configured to drive the light-sensing pixels to sense light; and a main driver circuit configured to receive first and second light-sensing signals through first and second light sensing lines connected to the light-sensing pixels. Each of the light-sensing pixels includes at least two photo-detecting elements spaced from each other, and the first and second light-sensing lines are configured to transmit the first and second light-sensing signals generated from the at least two photo-detecting elements.

In an embodiment, the at least two photo-detecting elements may include: a first photo-detecting element electrically connected to the first light-sensing line; and a second photo-detecting element electrically connected to the second light-sensing line.

In an embodiment, the first photo-detecting element may have a circular shape or a polygonal shape in a plan view, and may be configured to output the first light-sensing signal corresponding to an amount of light incident from a front side to the first light-sensing line. The second photo-detecting element may have a circular shape or a polygonal shape having a larger area than that of the first light-sensing element in a plan view, and may surround around the first photo-detecting element so that the first photo-detecting element may be located in an opening at an inner center of the second photo-detecting element.

In an embodiment, the second photo-detecting element may further include an opened side of the opening at the inner center where the first photo-detecting element may be located, and the first light-sensing line electrically connected to the first photo-detecting element may overlap with the opened side of the second photo-detecting element.

In an embodiment, an area of the opened side of the second photo-detecting element may be larger than the area of the first photo-detecting element in a plan view, a width or a thickness of the second photo-detecting element in at least one direction may be equal to or greater than a gap between the first photo-detecting element and the second photo-detecting element, and the width or the thickness of the second photo-detecting element in the at least one direction may be narrower or smaller than a width, a diameter, or a radius of the first photo-detecting element.

In an embodiment, the display panel may further include: a plurality of light-blocking patterns having a mesh structure. The mesh structure may be opened at a front side of light-emitting elements of the display pixels and a front side of the first photo-detecting elements of the light-sensing pixels, and may cover an area between the display pixels and an area between the display pixels and the light-sensing pixels.

In an embodiment, the plurality of light-blocking patterns may cover a front side of the second photo-detecting elements of the light-sensing pixels, and may have openings in line with front side positions of the first photo-detecting elements, the openings having a same shape as a shape of the first photo-detecting elements in a plan view. The openings may have an area that is equal to or larger than an area of the first photo-detecting elements in a plan view, and may be smaller or narrower than an area of the opening at an inner center of the second photo-detecting elements.

According to one or more embodiments of the present disclosure, an electronic device includes a display device, the display device including: a display panel having an image display area including image display pixels, infrared (IR) light-emitting pixels, and light-sensing pixels; a display scan driver configured to drive the image display pixels and the IR light-emitting pixels to emit light; a light-sensing scan driver configured to drive the light-sensing pixels to sense light; and a main driver circuit configured to receive first and second light-sensing signals through first and second light-sensing lines connected to the light-sensing pixels. Each of the light-sensing pixels includes at least two photo-detecting elements spaced from each other, and the first and second light-sensing lines are configured to transmit the first and second light-sensing signals generated from the at least two photo-detecting elements.

According to some embodiments of the present disclosure, it may be possible to increase the efficiency of sensing light for fingerprint detection and biometric information detection by disposing two photo-detecting elements in each light-sensing pixel in a display device. Accordingly, the accuracy of fingerprint detection and biometric information detection may be further improved.

According to some embodiments of the present disclosure, by improving the shape, the area, and the opening width of the black matrix of the two photo-detecting elements depending on conditions, such as the thickness of the display panel and the light detection height, it may be possible to measure fingerprints and biometric information more accurately. As a result, user reliability and satisfaction may be further improved.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
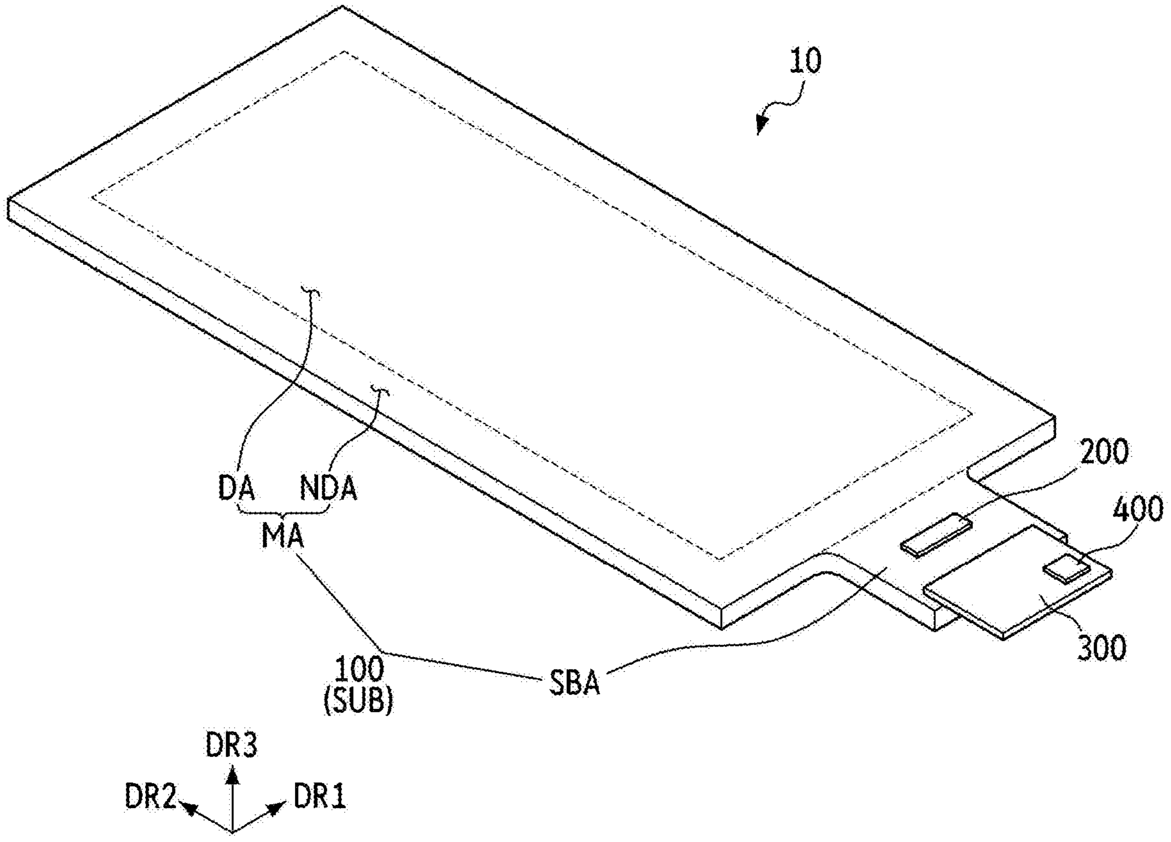
FIG. 1 is a perspective view of a display device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having,"

when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
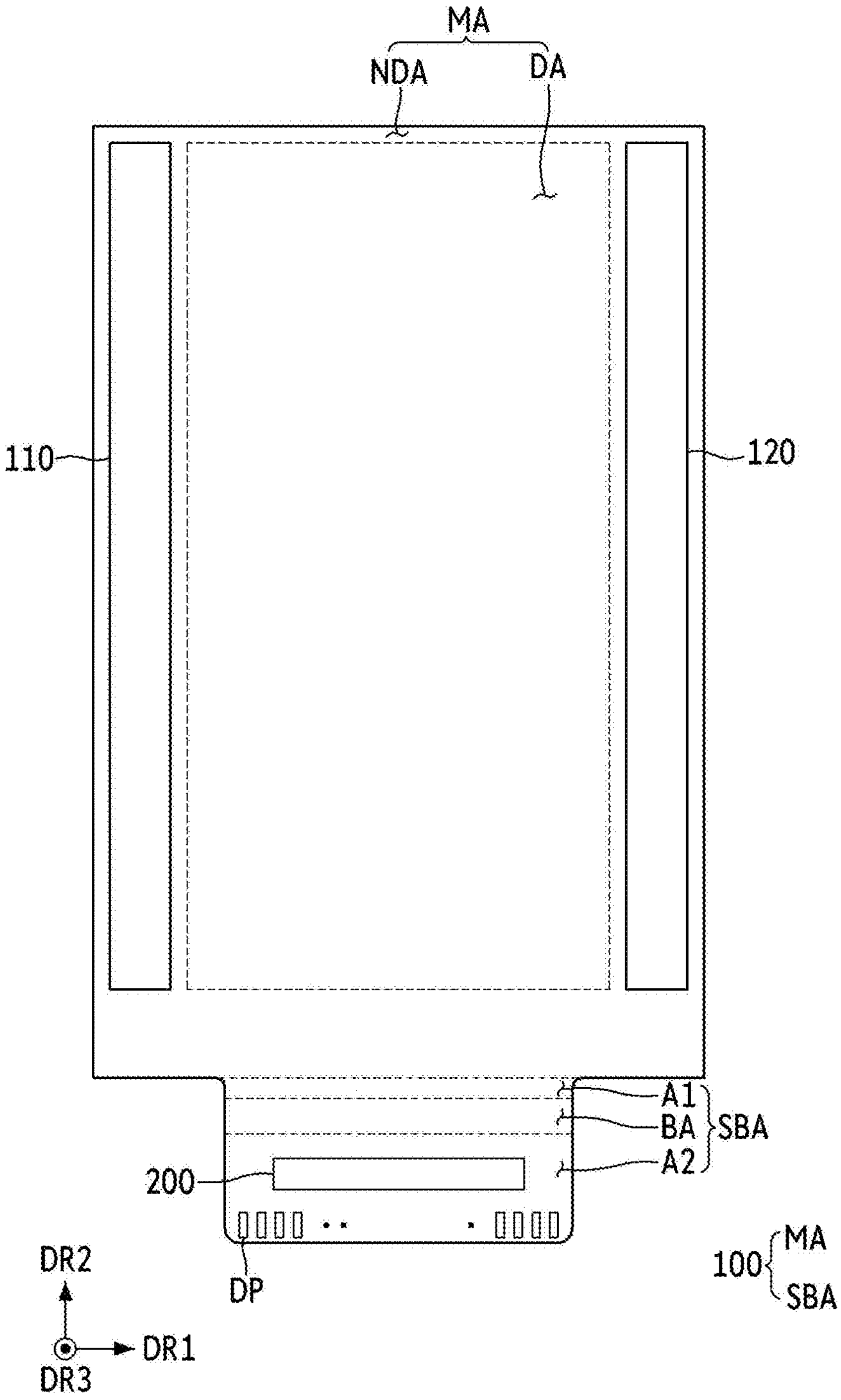
FIG. 2 is a plan view showing an arrangement structure of a display panel and a display driving circuit shown in FIG. 1.
Figure 3:
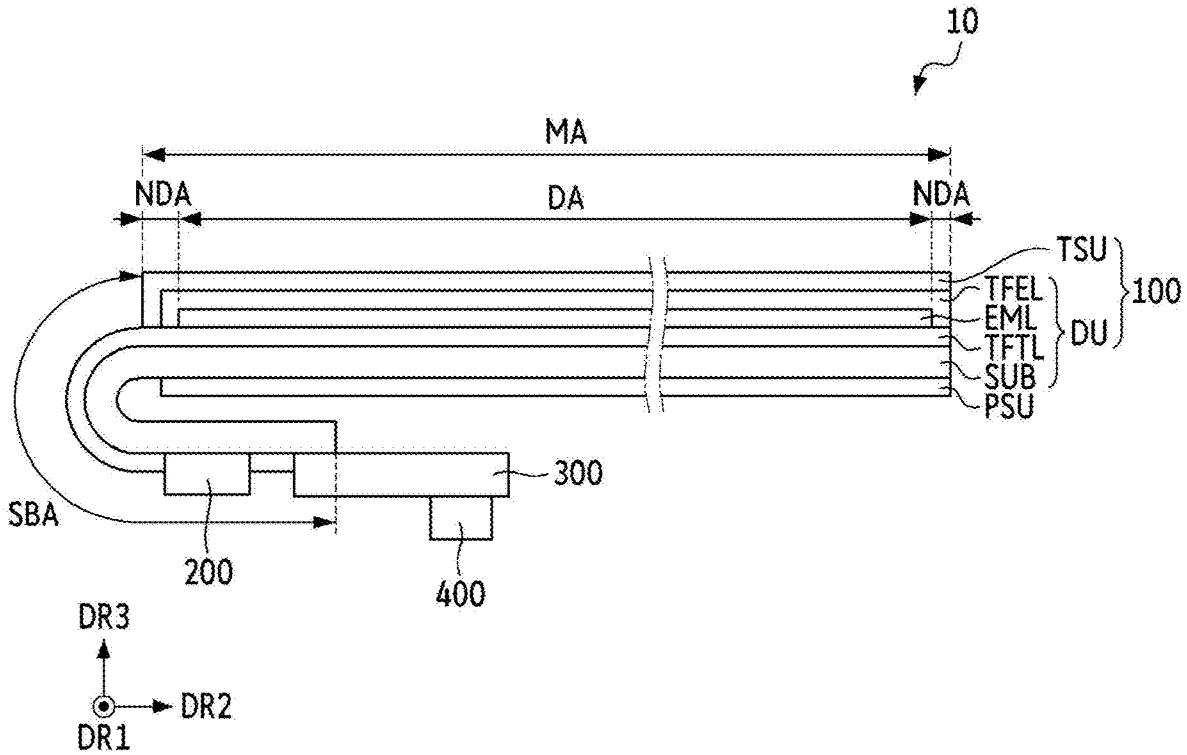
FIG. 3 is a side view illustrating a configuration of the display device shown in FIG. 1.

FIG. 1 is a perspective view of a display device according to an embodiment of the present disclosure. FIG. 2 is a plan view showing the arrangement structure of a display panel and a display driving circuit shown in FIG. 1. FIG. 3 is a side view illustrating a configuration of the display device shown in FIG. 1.

Referring first to FIGS. 1 and 2, a display device 10 according to an embodiment of the present disclosure may be employed by or included in various suitable portable electronic devices, such as a mobile phone, a smart phone, a tablet PC, a mobile communications terminal, an electronic notebook, an electronic book, a portable multimedia player (PMP), a navigation device, and a ultra mobile PC (UMPC). In addition, the display device 10 according to an embodiment of the present disclosure may be used as a display unit (e.g., a display or a touch-display) of a television, a laptop computer, a monitor, an electronic billboard, or an Internet of Things (IOT) device. As another example, the display device 10 according to an embodiment of the present disclosure may be applied to various suitable wearable devices, such as a smart watch, a watch phone, an glasses-type display, and a head-mounted display (HMD) device. In addition, the display device 10 according to an embodiment may be used as a center information display (CID) disposed at an instrument cluster, a center fascia or a dashboard of a vehicle, as a room mirror display replacing side mirrors of a vehicle, as a display placed on the back of each of the front seats as an entertainment system for passengers at the rear seats of a vehicle, and the like.

The display device 10 may be a light-emitting display device, such as an organic light-emitting display device using organic light-emitting diodes, an inorganic light-emitting display device including an inorganic semiconductor, and a micro light-emitting display device using micro or nano light-emitting diodes (e.g., micro LEDs or nano LEDs). Hereinafter, an organic light-emitting display device is described in more detail as an example of the display device 10. However, the present disclosure is not limited thereto.

Referring to FIGS. 1 to 3, the display device 10 includes a display panel 100, a main driver circuit 200, a touch sensing unit (e.g., a touch sensor, a touch sensing layer, or a touch sensing panel) TSU, a pressure sensing unit (e.g., a pressure sensor, a pressure sensing layer, or a pressure sensing panel) PSU, a circuit board 300, and a touch driver circuit 400.

The display panel 100 may be formed in a rectangular shape having shorter sides extending in the first direction DR1, and longer sides extending in the second direction DR2 crossing or intersecting the first direction DR1 when viewed from the top (e.g., in a plan view). Each of the corners where the shorter side extending in the first direction DR1 meets the longer side extending in the second direction DR2 may be formed at a right angle, or may be rounded with a suitable curvature (e.g., a predetermined curvature). The shape of the display panel 100 when viewed from the top (e.g., in a plan view) is not limited to a quadrangular shape, and may be formed in a different polygonal shape, a circular shape, or an elliptical shape. The display panel 100 may be formed to be flat or substantially flat, but the present disclosure is not limited thereto. For example, the display panel 100 may be formed at left and right ends, and may include a curved portion having a constant or substantially constant curvature or a varying curvature. In addition, the display panel 100 may be flexible so that it can be curved, bent, folded, or rolled.

A substrate SUB of the display panel 100 may include a main area MA and a subsidiary area SBA.

The main area MA may include a display area DA where images are displayed, and a non-display area NDA around the display area DA.

The non-display area NDA may be disposed adjacent to the display area DA. The non-display area NDA may be located on the outer side of the display area DA. The non-display area NDA may surround (e.g., around a periphery of) the display area DA. The non-display area NDA may be defined as a border of the display panel 100.

The display area DA includes display pixels that display images, and light-sensing pixels that sense light reflected off a part of a user's body, such as the face and/or a finger. In addition, the display area DA may further include infrared (IR) light-emitting pixels that emit infrared light.

The display area DA may occupy most of the main area MA. The display area DA may be disposed at the center of the main area MA.

The display area DA may be divided into an image display area where only display pixels are disposed without light-sensing pixels, and a biometric information measurement area where IR light-emitting pixels and light-sensing pixels are disposed together. In other words, the IR light-emitting pixels and the light-sensing pixels may be disposed together with the display pixels in (e.g., only in) a suitable part (e.g., a predetermined part) of the display area DA (e.g., from among the entire display area DA) of the display panel 100 (e.g., such as only in the biometric information measurement area). Hereinafter, an example will be described in which the display pixels, the IR light-emitting pixels, and the light-sensing pixels are arranged together in the entire display area DA according to an embodiment.

Referring to FIGS. 2 and 3, the subsidiary area SBA may protrude from one side of the main area MA in the second direction DR2. The length of the subsidiary area SBA in the second direction DR2 may be smaller than the length of the main area MA in the second direction DR2. The length of the subsidiary area SBA in the first direction DR1 may be less than or substantially less than the length of the main area MA in the first direction DR1, or may be equal to substantially equal to it.

The subsidiary area SBA may include a first area A1, a second area A2, and a bending area BA.

The first area A1 protrudes from one side of the main area MA in the second direction DR2. One side of the first area A1 may be in contact with the non-display area NDA of the main area MA, and the opposite side of the first area A1 may be in contact with the bending area BA.

In the second area A2, pads DP and the main driver circuit 200 are disposed. The main driver circuit 200 may be attached to driving pads of the second area A2 using a conductive adhesive member, such as an anisotropic conductive layer. The circuit board 300 may be attached to the pads DP of the second area A2 using a conductive adhesive member. One side of the second area A2 may be in contact with the bending area BA.

The bending area BA is a part of the display panel 100 that is bendable. When the bending area BA is bent, the second area A2 may be disposed under the first area A1 and under the main area MA. The bending area BA may be disposed between the first area A1 and the second area A2. One side of the bending area BA may be in contact with the first area A1, and the opposite side of the bending area BA may be in contact with the second area A2.

As shown in FIG. 3, the subsidiary area SBA may be bent. When the subsidiary area SBA is bent, a part of the subsidiary area SBA may be located on the rear surface of, or under, the main area MA. A part of the subsidiary area SBA may overlap with the main area MA in the thickness direction DR3.

The touch sensing unit TSU that senses a part of a user's body, such as a finger, and an electronic pen may be formed or disposed on the front surface of the display panel 100. The touch sensing unit TSU may include a plurality of touch electrodes to sense a user's touch by a capacitive sensing.

The touch sensing unit TSU includes a plurality of touch electrodes arranged so that they cross each other in the first and second directions DR1 and DR2. In more detail, the plurality of touch electrodes includes a plurality of driving electrodes arranged in parallel with each other and spaced apart from one another in the first direction DR1, and a plurality of sensing electrodes arranged in parallel with each other and spaced apart from one another in the second direction DR2. The sensing electrodes may cross the driving electrodes with an organic material layer or an inorganic material layer therebetween. The driving electrodes and the sensing electrodes may be extended in a wiring area between the display pixels and the light-sensing pixels, so that they do not overlap with the display pixels or the light-sensing pixels arranged in the display area DA. The driving electrodes and sensing electrodes form a mutual capacitance, and transmit touch sensing signals that are changed according to a user's touch to the touch driver circuit 400.

The touch driver circuit 400 may supply touch driving signals to the plurality of driving electrodes, and may receive touch sensing signals from the plurality of sensing electrodes RE. Then, the touch driver circuit 400 senses changes in mutual capacitance between the driving electrodes and the sensing electrodes based on changes in the magnitude of the touch sensing signals. The touch driver circuit 400 generates touch data based on the changes in mutual capacitance between driving electrodes and sensing electrodes and identifies the position where the touch has been sensed. Accordingly, the coordinate data of the position where the touch has been sensed may be provided to the main driver circuit 200.

Figure 4:
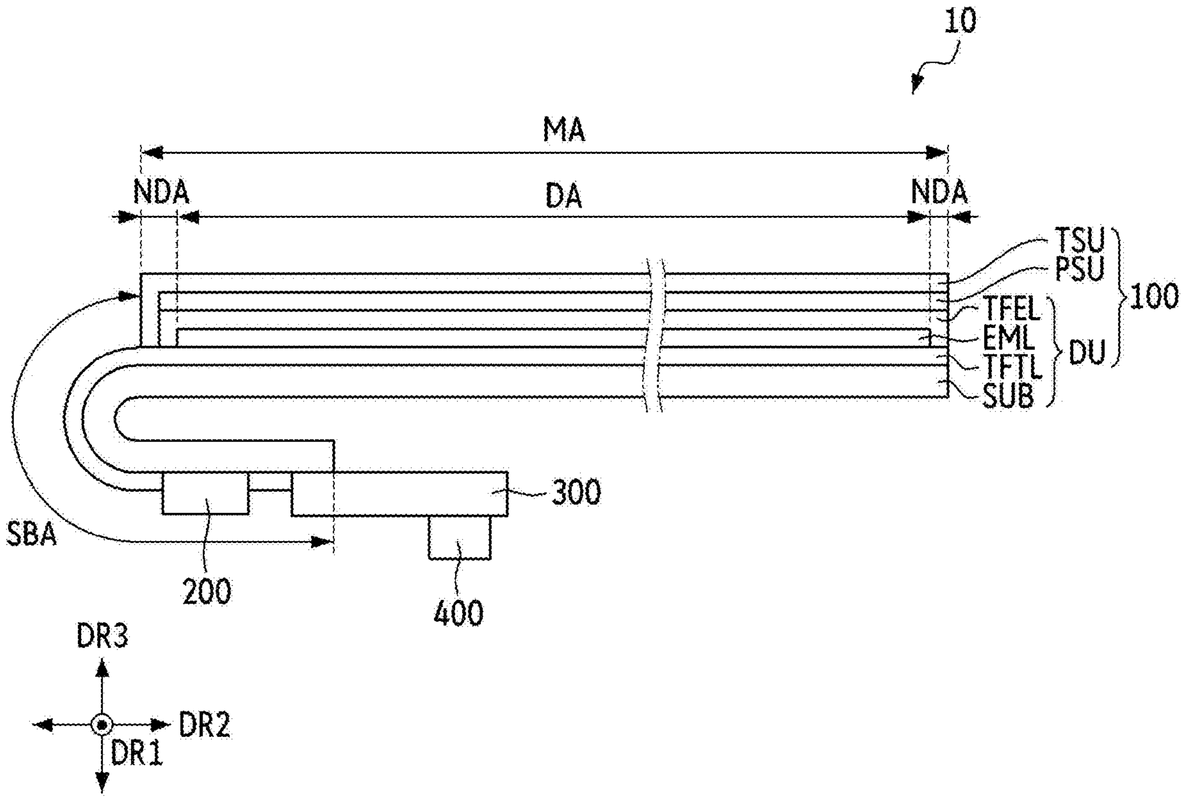
FIG. 4 is a side view illustrating a configuration of the display device shown in FIG. 1 according to another embodiment.

FIG. 4 is a side view illustrating a configuration of the display device shown in FIG. 1 according to another embodiment.

The pressure sensing unit PSU that senses a pressure applied by a part of a user's body, such as a finger, may be disposed or formed on the front surface of the display panel 100 (e.g., on the surface between the display panel 100 and the touch sensing unit TSU). As such, the pressure sensing unit PSU may be formed on the front surface of the display panel 100, and on the rear surface of the touch sensing unit TSU. As another example, the pressure sensing unit PSU may be formed on the rear surface of the substrate SUB, or may be formed on the front surface of the substrate SUB. The pressure sensing unit PSU may detect absolute measurements associated with a blood pressure, but may not detect relative measurements associated with a blood pressure.

The pressure sensing unit PSU may be formed as a transparent sheet in which transparent electrodes are arranged in vertical and horizontal directions, and may be disposed on the front surface of the main area MA. As another example, the pressure sensing unit PSU may be disposed or formed inside or on the front surface of the display panel 100.

The pressure sensing unit TSU includes a plurality of pressure sensing electrodes arranged to cross each other in the first and second directions DR1 and DR2. The plurality of pressure sensing electrodes includes a plurality of lower electrodes arranged in parallel with each other and spaced apart from one another in the first direction DR1, and a plurality of upper electrodes arranged in parallel with each other and spaced apart from one another in the second direction DR2. The upper electrodes may cross the lower electrodes with a transparent inorganic (or organic) material layer therebetween. The lower electrodes and the upper electrodes form a mutual capacitance with a transparent inorganic (or organic) material layer therebetween, and transmit pressure sensing signals that are changed according to a user's touch to the touch driver circuit 400.

When the pressure sensing unit PSU is disposed on the inner surface or the front surface of the display panel 100, the pressure sensing electrodes of the pressure sensing unit PSU (e.g., a plurality of lower electrodes and upper electrodes) may be extended in the wiring area between the display pixels and the light-sensing pixels, so that they do not overlap with the display pixels and light-sensing pixels arranged in the display area DA. The touch driver circuit 400 may provide a reference voltage to the lower electrodes of the pressure sensing unit PSU, may receive pressure-sensing signals from the upper electrodes, and may sense changes in a self-capacitance of the pressurized areas through the pressure-sensing signals. Accordingly, the touch driver circuit 400 may generate pressure data according to changes in the self-capacitance, and may sense coordinate data of the position where the pressure is sensed and the like, to provide them to the main driver circuit 200. The pressure sensing unit PSU may have various other suitable structures in addition to the structure using the pressure sensing electrodes, and is not limited to that shown in FIGS. 3 and 4.

The circuit board 300 may be attached to one end of the subsidiary area SBA. Accordingly, the circuit board 300 may be electrically connected to the display panel 100 and the main driver circuit 200. The display panel 100 and the main driver circuit 200 may receive digital video data, timing signals, and driving voltages through the circuit board 300. The circuit board 300 may be a flexible printed circuit board, a printed circuit board, or a flexible film, such as a chip-on film.

The main driver circuit 200 may generate electric signals for driving the display panel 100, such as control signals and data voltages. Each of the main driver circuit 200 and the touch driver circuit 400 may be implemented as an integrated circuit (IC), and may be attached to the display panel 100 or the circuit board 300 by a chip-on-glass (COG) technique, a chip-on-plastic (COP) technique, or ultrasonic bonding. However, the present disclosure is not limited thereto. For example, the main driver circuit 200 and the touch driver circuit 400 may be attached on the circuit board 300 by a chip-on-film (COF) technique.

Figure 5:
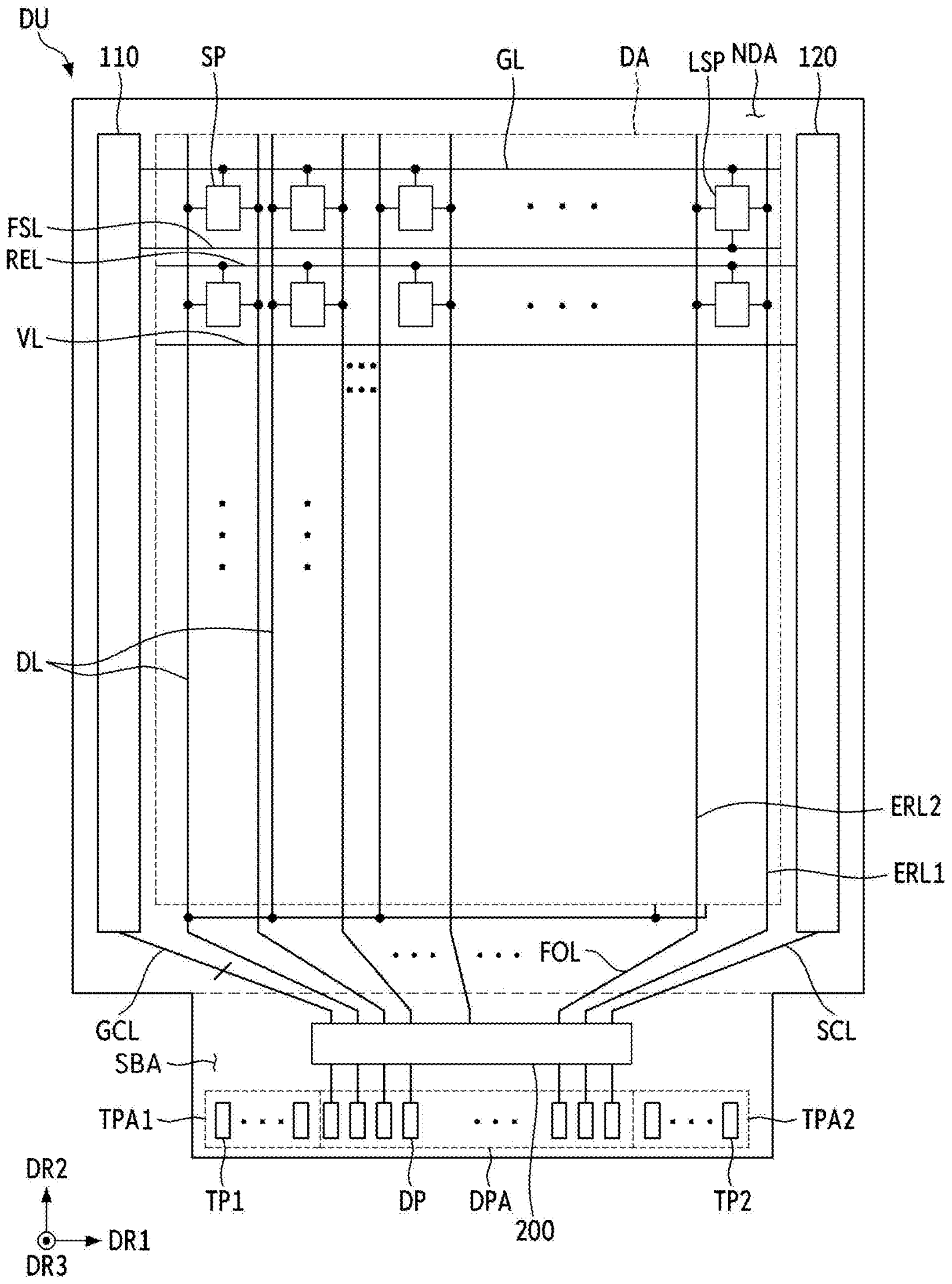
FIG. 5 is a view illustrating an example of a layout of the display panel shown in FIG. 1.

FIG. 5 is a view illustrating an example of a layout of the display panel shown in FIG. 1. In more detail, FIG. 5 is a layout view showing the display area DA and the non-display area NDA of a display module DU before the touch sensing unit TSU is formed.

Referring to FIGS. 4 and 5, in the display panel 100 of the display device 10 according to an embodiment, a display scan driver 110, a photo-sensing scan driver 120, and the main driver circuit 200 may be disposed. In addition, the touch driver circuit 400 and a power supply unit (e.g., a power supply or a power supply circuit) may be disposed on the circuit board 300 connected to the display panel 100. The main driver circuit 200 and the touch driver circuit 400 may be implemented as one integrated-chip, and may be mounted on the display panel 100 or the circuit board 300. Hereinafter, the main driver circuit 200 and the touch driver circuit 400 will be described in more detail as being formed as different integrated circuits from each other for convenience of illustration, but the present disclosure is not limited thereto.

Referring to FIG. 5, the display panel 100 may include display pixels SP, light-sensing pixels LSP, IR light-emitting pixels, display scan lines GL, emission control lines VL, data lines DL, sense scan lines FSL, sense reset lines REL, and first and second light-sensing lines ERL1 and ERL2, which are disposed in the display area DA. The display scan driver 110 and the light-sensing scan driver 120 are disposed in the non-display area NDA.

The display scan lines GL sequentially supply display scan signals applied for each horizontal line from the display scan driver 110 to the display pixels SP for each horizontal line as well as the IR light-emitting pixels. The display scan lines GL may be extended in the first direction DR1, and may be spaced apart from one another in the second direction DR2 crossing or intersecting the first direction DR1.

The emission control lines VL sequentially supply emission control signals applied for each horizontal line from the display scan driver 110 to the display pixels SP for each horizontal line and the IR light-emitting pixels. The emission control lines VL may be extended in the first direction DR1 in parallel with the display scan lines GL, and may be spaced apart from one another in the second direction DR2 crossing or intersecting the first direction DR1.

The data lines DL may provide the data voltage received from the main driver circuit 200 to the plurality of display pixels SP. The plurality of data lines DL may be extended in the second direction DR2, and may be spaced apart from one another in the first direction DR1.

The light-sensing scan lines FSL sequentially provide sense scan signals applied from the light-sensing scan driver 120 for each horizontal line to a plurality of light-sensing pixels LSP. The plurality of light-sensing scan lines FSL may be extended in the first direction DR1, and may be spaced apart from one another in the second direction DR2 crossing or intersecting the first direction DR1.

The sense reset lines REL sequentially supply sense reset signals applied for each horizontal line from the light-sensing scan driver 120 to the light-sensing pixels LSP for each horizontal line. The sense reset lines REL may be extended in the first direction DR1 in parallel with the light-sensing scan lines FSL, and may be spaced apart from one another in the second direction DR2 crossing or intersecting the first direction DR1.

The first and second light-sensing lines ERL1 and ERL2 may be connected between the light-sensing pixels LSP and the main driver circuit 200 to provide first and second light-sensing signals output from the light-sensing pixels LSP to the main driver circuit 200. The first and second light-sensing lines ERL1 and ERL2 may be arranged and extended in the second direction DR2 according to the arrangement direction of the main driver circuit 200, and may be spaced apart from one another in the first direction DR1.

The non-display area NDA may surround (e.g., around a periphery of) the display area DA. This non-display area NDA may include the display scan driver 110, the light-sensing scan driver 120, fan-out lines FOL, gate control lines GCL, and sense control lines SCL.

The display pixels SP and the light-sensing pixels LSP may form first pixel groups, and may be arranged in a matrix in the first direction DR1 and the second direction DR2 in the display area DA. When at least one IR light-emitting pixel is additionally disposed in the display area DA, a plurality of display pixels SP and the at least one IR light-emitting pixel may form a second pixel group. Second pixel groups may be arranged in a matrix pattern in the display area DA, such that they alternate with the first pixel groups.

For example, three display pixels SP that respectively display red, green, and blue light and one light-sensing pixel LSP may form a single first unit pixel. In addition, three display pixels SP that respectively display red, green, and blue light and one IR light-emitting pixel may form a single second unit pixel. The first unit pixels and the second unit pixels may be alternately arranged in horizontal or vertical stripes to form a matrix pattern. As another example, the first unit pixels and the second unit pixels may be alternately arranged in a zigzag pattern when viewed from the top (e.g., in a plan view), and may be arranged in a matrix pattern in a diagonal direction.

Each of the red, green, and blue display pixels SP and the IR light-emitting pixels may be connected to one of the display scan lines GL and one of the emission control lines VL. During an image display period, red, green, and blue display pixels SP may receive the data voltage from the data line DL in response to the display scan signal from the display scan line GL and the emission control signal from the emission control line VL, and may emit light by providing a driving current to the light-emitting element according to the data voltage. During a biometric information measurement period, such as blood pressure, heart rate, oxygen saturation, and/or vascular elasticity, the display pixels SP representing at least one color among red, green, and blue display pixels SP may selectively receive a data voltage for emission along with a display scan signal and an emission control signal to emit light. In addition, during the biometric information measurement period, such as blood pressure and heart rate, the IR light-emitting pixels may selectively receive a data voltage for light emission along with a display scan signal and an emission control signal to display infrared light.

The light-sensing pixels LSP may be alternately arranged with the red, green, and blue display pixels SP in the vertical or horizontal direction. Each of the light-sensing pixels LSP may be connected to one of the light-sensing scan lines FSL, one of the sense reset lines REL, and one of the light-sensing lines ERL. During the biometric information measurement period, such as blood pressure, respiratory rate, oxygen saturation, and/or cardiovascular disease, the light-sensing pixels LSP may be reset in response to a sense reset signal from sense reset lines REL, and then may generate a light-sensing signal in proportional to the amount of reflected light incident from the front side to output it. In addition, each of the light-sensing pixels LSP may transmit the light-sensing signals to the light-sensing lines ERL in response to the sense scan signal from the light-sensing scan lines FSL.

The light-sensing pixels LSP for each horizontal line may be connected to a display scan line GL for each horizontal line. Each of the light-sensing pixels LSP may generate a light-sensing signal proportional to the amount of reflected light incident from the front side, and may output the light-sensing signal to the light-sensing line ERL in response to a display scan signal input through the display scan line GL.

The display scan driver 110 may be disposed in the non-display area NDA. Although the display scan driver 110 is disposed on one side (e.g., the left side) of the display panel 100 in FIG. 5, the present disclosure is not limited thereto. For example, the display scan driver 110 may be disposed on both sides (e.g., left and right sides) of the display panel 100.

The display scan driver 110 may be electrically connected to the main driver circuit 200 through gate control lines GCL. The display scan driver 110 receives a scan control signal from the main driver circuit 200, sequentially generates display scan signals for each horizontal line driving period in response to the scan control signal, and sequentially supplies them to the display scan lines GL. In addition, the display scan driver 110 may sequentially generate emission control signals according to the scan control signal from the main driver circuit 200, and may sequentially supply them to the emission control lines VL.

The gate control line GCL may be extended from the main driver circuit 200 to the display scan driver 110 depending on the position of the display scan driver 110. The gate control line GCL may supply the scan control signal received from the main driver circuit 200 to the display scan driver 110.

The light-sensing scan driver 120 may be disposed at a position in the non-display area NDA that is different from the position of the display scan driver 110. Although the light-sensing scan driver 120 is disposed on the other side (e.g., right side) of the display panel 100 in the example shown in FIG. 5, the present disclosure is not limited thereto. The light-sensing scan driver 120 may be electrically connected to the main driver circuit 200 through light-sensing control lines SCL. The light-sensing scan driver 120 receives a light-sensing control signal from the main driver circuit 200, and sequentially generates reset control signals and sense scan signals for each horizontal line driving period according to the light-sensing control signal. Then, the light-sensing scan driver 120 may sequentially provide the sequentially generated reset control signals to the sense reset lines REL. In addition, the light-sensing scan driver 120 may sequentially generate the sense scan signals in response to the light-sensing control signal from the main driver circuit 200, and sequentially provide them to the sense scan lines FSL.

The light-sensing control line SCL may be extended from the main driver circuit 200 to the light-sensing scan driver 120 depending on the position of the light-sensing scan driver 120. The light-sensing control line SCL may provide the light-sensing control signal received from the main driver circuit 200 to the light-sensing scan driver 120.

The subsidiary area SBA may include the main driver circuit 200, a display pad area DPA, and first and second touch pad areas TPA1 and TPA2. The display pad area DPA, the first touch pad area TPA1, and the second touch pad area TPA2 may be disposed on the edge of the subsidiary area SBA. The display pad area DPA, the first touch pad area TPA1, and the second touch pad area TPA2 may be electrically connected to the circuit board 300 using a low-resistance, high-reliability material, such as an anisotropic conductive layer and a SAP.

The fan-out lines FOL may be extended from the main driver circuit 200 to the display area DA. In addition, the fan-out lines FOL may be connected so that the data voltage received from the main driver circuit 200 is applied to the plurality of data lines DL.

The main driver circuit 200 may output signals and voltages for driving the display panel 100 to the fan-out lines FOL. The main driver circuit 200 may provide data voltages to the data lines DL through the fan-out lines FOL. The data voltages may be applied to the plurality of pixels SP, so that the luminance of the plurality of display pixels SP may be determined. The main driver circuit 200 may supply a scan control signal to the display scan driver 110 through the gate control line GCL.

The main driver circuit 200 receives first and second light-sensing signals from the light-sensing pixels LSP through the first and second light-sensing lines ERL1 and ERL2, and detects fingerprint recognition signals and biometric signals associated with changes in the magnitude of the first and second light-sensing signals.

In more detail, the main driver circuit 200 receives first light-sensing signals from the light-sensing pixels LSP through the first light-sensing lines ERL1, and detects fingerprint recognition signals associated with changes in the magnitude of the first light-sensing signals.

The main driver circuit 200 receives second light-sensing signals from the light-sensing pixels LSP through the second light-sensing lines ERL2, and detects photoplethysmography signals among biological signals associated with changes in the magnitude of the second light-sensing signals (e.g., pulse wave signals).

The biological signals may further include electromyography signals, brain wave signals, and/or the like, in addition to pulse wave signals. Hereinafter, the main driver circuit 200 may be described in more detail as detecting and analyzing pulse wave signals among the biological signals to measure the user's biometric information as an example. The user's biometric information includes information, such as blood pressure, heart rate, heart rate variability, respiratory rate, blood vessel elasticity, cardiovascular disease, and/or oxygen saturation.

The main driver circuit 200 may guide a fingerprint recognition signal or a pulse signal detection process with an application (e.g., a predetermined application) on the screen, so that the user's fingerprint recognition signals or pulse signals may be accurately detected. When recognizing a fingerprint, it may be possible to sample and select fingerprint recognition signals that are detected more accurately, by analyzing fingerprint recognition signals according to the first light-sensing signal. Then, a user authentication process and/or the like may be performed based on the results of analyzing the fingerprint recognition signals.

In addition, when detecting biometric information, the main driver circuit 200 may analyze pulse signals according to the second light-sensing signal to sample and select pulse signals that are detected more accurately. The main driver circuit 200 may analyze pulse wave signals every suitable period (e.g., every predetermined period), and may measure biometric information, such as blood pressure, heart rate, heart rate variability, respiratory rate, blood vessel elasticity, cardiovascular disease, and/or oxygen saturation. Accordingly, the main driver circuit 200 may display the biometric information measurements, such as blood pressure, heart rate, heart rate variability, respiratory rate, vascular elasticity, cardiovascular disease, and/or oxygen saturation, as applications on the screen.

Figure 6:
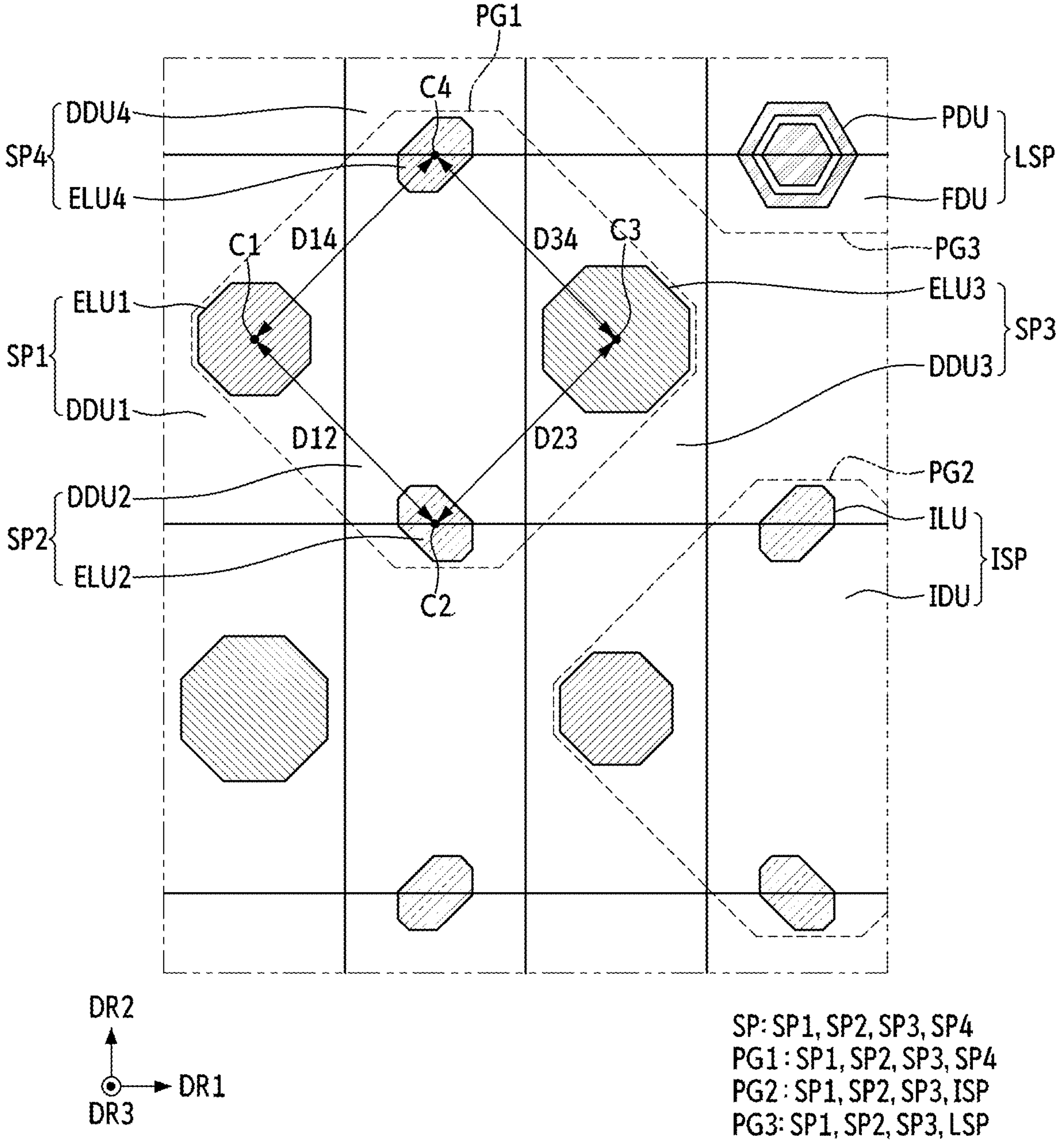
FIG. 6 is a view illustrating a layout of a display area according to an embodiment of the present disclosure.

FIG. 6 is a view illustrating a layout of a display area according to an embodiment of the present disclosure.

Referring to FIG. 6, the display area DA may include display pixels SP, IR light-emitting pixels ISP, and light-sensing pixels LSP. The display pixels SP may include (e.g., may be divided into) first display pixels SP1, second display pixels SP2, third display pixels SP3, and fourth display pixels SP4.

A first display pixel SP1, a second display pixel SP2, a third display pixel SP3, and a fourth display pixel SP4 may be defined as a first pixel group PG1.

An IR light-emitting pixel ISP along with a first display pixel SP1, a second display pixel SP2, and a third display pixel SP3 may be defined as a second pixel group PG2.

A light-sensing pixel LSP along with a first display pixel SP1, a second display pixel SP2, and a third display pixel SP3 may be defined as a third pixel group PG3.

Each of the first to third pixel groups PG1, PG2, and PG3 may be defined as a display pixel that is the minimum unit for representing a white color. The light-sensing pixel LSP included in each third pixel group PG3 may sense light incident from the front.

The first pixel group PG1, the second pixel group PG2, and the third pixel group PG3 are arranged sequentially and repeatedly in a zigzag pattern when viewed from the top (e.g., in a plan view). As another example, the first pixel group PG1, the second pixel group PG2, and the third pixel group PG3 may be arranged in a diagonal direction in a matrix pattern. In addition, the first pixel groups PG1 and the second pixel groups PG2 may be arranged alternately with each other in horizontal or vertical stripes to form a matrix pattern, or may be arranged alternately with each other in a diagonal direction when viewed from the top (e.g., in a plan view). In addition, the first pixel groups PG1 and the third pixel groups PG3 may be arranged alternately with each other in horizontal or vertical stripes to form a matrix pattern, or may be arranged alternately with each other in a diagonal direction when viewed from the top (e.g., in a plan view). As such, the second pixel groups PG2 and the third pixel groups PG3 may also be arranged alternately with each other in horizontal or vertical stripes to form a matrix pattern when viewed from the top (e.g., in a plan view).

The first display pixel SP1 may include a first light-emitting unit (e.g., a first light-emitting element) ELU1 that emits a first light, and a first pixel driving unit (e.g., a first pixel driving circuit) DDU1 that applies a driving current to the light-emitting element of the first light-emitting unit ELU1. The first light may be light in a red wavelength range. For example, the main peak wavelength of the first light may be located between approximately 600 nm and 750 nm.

The second display pixel SP2 may include a second light-emitting unit (e.g., a second light-emitting element) ELU2 that emits a second light, and a second pixel driving unit (e.g., a second pixel driving circuit) DDU2 that applies a driving current to the light-emitting element of the second light-emitting unit ELU2. The second light may be light in a blue wavelength range. For example, the main peak wavelength of the second light may be located between approximately 370 nm and 460 nm.

The third display pixel SP3 may include a third light-emitting unit (e.g., a third light-emitting element) ELU3 that emits a third light, and a third pixel driving unit (e.g., a third pixel driving circuit) DDU3 that applies a driving current to the light-emitting element of the third light-emitting unit ELU3. The third light may be light in a green wavelength range. For example, the main peak wavelength of the third light may be located between approximately 480 nm and 560 nm.

The fourth display pixel SP4 may include a fourth light-emitting unit (e.g., a fourth light-emitting element) ELU4 that emits a fourth light, and a fourth pixel driving unit (e.g., a fourth pixel driving circuit) DDU4 that applies a driving current to the light-emitting element of the fourth light-emitting unit ELU4. The fourth light-emitting unit ELU4 may have the same or substantially the same structure as that of the second light-emitting unit ELU2 or the third light-emitting unit ELU3, and may emit light of the same wavelength range as the light of the second light-emitting unit ELU2 or the third light-emitting unit ELU3. For example, the fourth light-emitting unit ELU4 may have the same or substantially the same structure as that of the second light-emitting unit ELU2, and may emit light in the blue wavelength range.

The IR light-emitting pixel ISP of the second pixel group PG2 may include an infrared light-emitting unit (e.g., an infrared light-emitting element) ILU that emits light in the infrared wavelength range, and an infrared driving unit (e.g., an infrared driving circuit) IDU for applying a driving current to the light-emitting element of the infrared light-emitting unit ILU. The main peak wavelength of infrared light may be between approximately 750 nm to 1 mm.

The light-sensing pixel LSP of the third pixel group PG3 includes a photo-detecting unit (e.g., a photo-detecting element) PDU that detects light incident from the front side, and a detection driving unit (e.g., a detection driving circuit) FDU that applies a driving current to first and second photo-detecting elements of the photo-detecting unit PDU.

In the first pixel group PG1, the first and third pixel driving units DDU1 and DDU3 may be arranged in a suitable order (e.g., a predetermined order) in the first direction DR1. In addition, the second and fourth pixel driving units DDU1 and DDU4 may be arranged in a suitable order (e.g., a predetermined order) in the second direction DR2. One of the first to fourth pixel driving units DDU1 to DDU4 may be arranged in the first direction DR1 with another adjacent pixel driving unit (e.g., another adjacent pixel driving circuit).

The second and fourth pixel driving units DDU2 and DDU4 adjacent to each other in the data line DL direction may be arranged in the second direction DR2. The first and third pixel driving units DDU1 and DDU3 adjacent to each other in the gate line GL direction may be arranged in the first direction DR1.

The first light-emitting unit ELU1, the second light-emitting unit ELU2, the third light-emitting unit ELU3, and the fourth light-emitting unit ELU4 of the first pixel group PG1 may have, but is not limited to, a rectangular shape, an octagonal shape, or a diamond shape when viewed from the top (e.g., in a plan view). In addition, the first to fourth light-emitting units ELU1 to ELU4, or the first to third light-emitting units ELU1 to ELU3, the infrared light-emitting unit ILU, and the photo-detecting unit PDU may have other suitable polygonal shapes different from a rectangular shape, an octagonal shape, or a diamond shape when viewed from the top (e.g., in a plan view).

Due to layout positions and shapes of the first light-emitting unit ELU1, the second light-emitting unit ELU2, the third light-emitting unit ELU3, and the fourth light-emitting unit ELU4 when viewed from the top (e.g., in a plan view), a distance D12 between the center C1 of the first light-emitting unit ELU1 and the center C2 of the second light-emitting unit ELU2, a distance D23 between the center C2 of the second light-emitting unit ELU2 and the center C3 of the third light-emitting unit ELU3 adjacent each other, a distance D14 between the center C1 of the first light-emitting unit ELU1 and the center C4 of the fourth light-emitting unit ELU4 adjacent each other in another direction, and a distance D34 between the center C3 of the third light-emitting unit ELU3 and the center C4 of the fourth light-emitting unit ELU4 may be all equal or substantially equal to each other.

The layout structure of the first to third display pixels SP1 to SP3 of the first pixel group PG1 may correspond to that of the first to third display pixels SP1 to SP3 of the second pixel group PG2. The layout structure of the fourth display pixel SP4 of the first pixel group PG1 may correspond to that of the IR light-emitting pixel ISP of the second pixel group PG2.

Referring to the layout structure of the first pixel group PG1, the first and third pixel driving units DDU1 and DDU3 included in the second pixel group PG2 may be arranged in a suitable order (e.g., a predetermined order) in the first direction DR1. In addition, the second pixel driving unit DDU2 and the infrared driving unit IDU may be arranged in a suitable order (e.g., a predetermined order) in the second direction DR2. The first light-emitting unit ELU1, the second light-emitting unit ELU2, the third light-emitting unit ELU3, and the infrared light-emitting unit ILU of each second pixel group PG2 may have, but is not limited to, a rectangular shape, an octagonal shape, or a diamond shape when viewed from the top (e.g., in a plan view).

The layout structure of the first, third, and fourth display pixels SP1, SP3, and SP4 of the first pixel group PG1 may correspond to that of the first, third, and fourth display pixels SP1, SP3, and SP4 of the third pixel group PG3. The layout structure of the second display pixel SP2 of the first pixel group PG1 may correspond to that of the light-sensing pixel LSP of the third pixel group PG3.

On the other hand, the layout structure of the first to third display pixels SP1 to SP3 of the first pixel group PG1 may correspond to that of the first to third display pixels SP1 to SP3 of the third pixel group PG3. The layout structure of the fourth display pixel SP4 of the first pixel group PG1 may correspond to that of the light-sensing pixel LSP of the third pixel group PG3.

Referring to the layout structure of the first pixel group PG1, the first and third pixel driving units DDU1 and DDU3 included in the third pixel group PG3 may be arranged in a suitable order (e.g., a predetermined order) in the first direction DR1. In addition, the detection driving unit FDL and the fourth pixel driving unit DDU4 may be arranged in a suitable order (e.g., a predetermined order) in the second direction DR2. The detection driving unit FDU may be arranged in the first direction DR1 of one of the first or third pixel driving units DDU1 or DDU3. As another example, the detection driving unit FDU may be arranged in the second direction DR2 with the fourth pixel driving unit DDU4.

The first light-emitting unit ELU1, the second light-emitting unit ELU2, and the third light-emitting unit ELU3 of the third pixel group PG1 may have, but is not limited to, a rectangular shape, an octagonal shape, or a diamond shape when viewed from the top (e.g., in a plan view).

Figure 7:
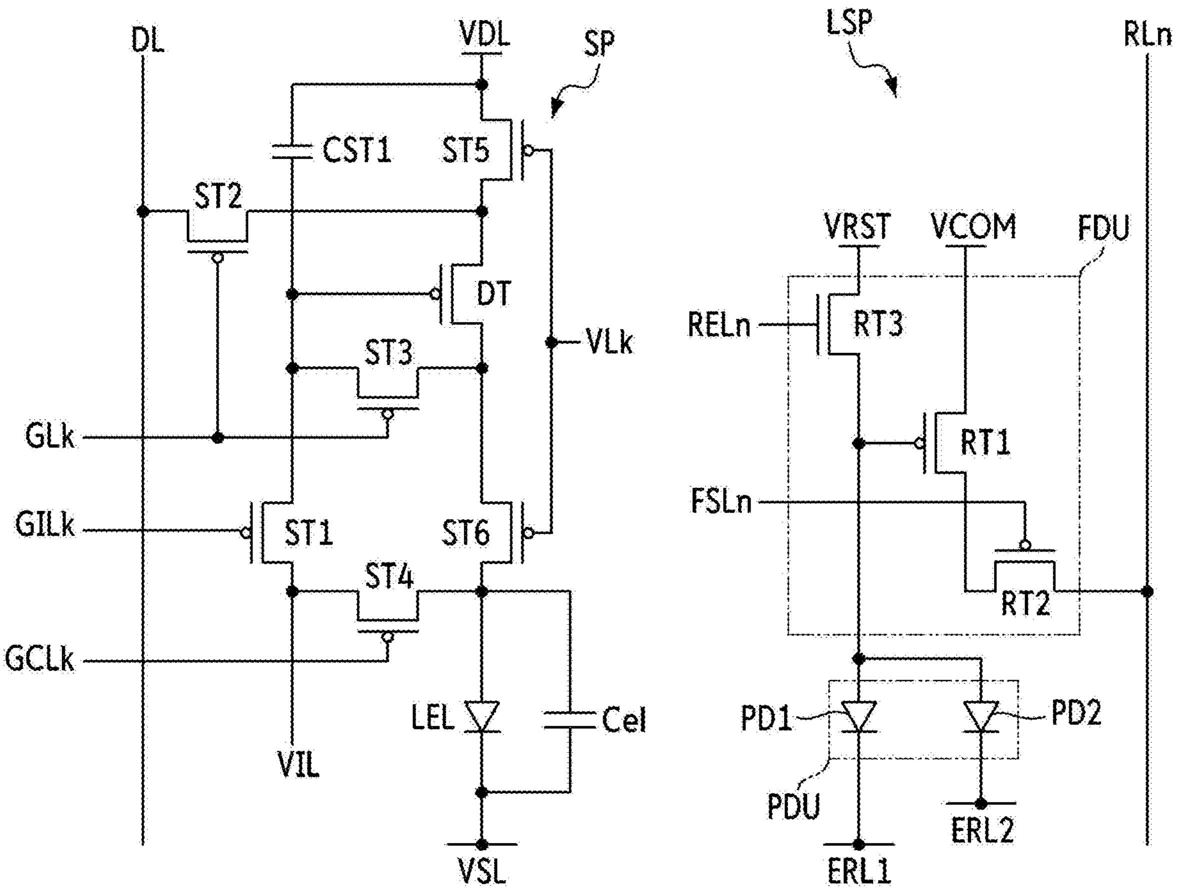
FIG. 7 is a circuit diagram illustrating a display pixel and a light-sensing pixel according to an embodiment of the present disclosure.

FIG. 7 is a circuit diagram showing a display pixel and a light-sensing pixel according to an embodiment of the present disclosure.

Referring to FIGS. 6 and 7, the display pixel SP according to an embodiment, for example, such as one of the first to fourth display pixels, may be connected to a $k^{th}$ display initialization line GILk, a $k^{th}$ display scan line GLk, a $k^{th}$ display control line GCLK, and a $k^{th}$ emission control line VLK. In addition, the display pixel SP may be connected to a first supply voltage line VDL from which a first supply voltage is supplied, a second supply voltage line VSL from which a second supply voltage is supplied, and a third supply voltage line VIL from which a third supply voltage is supplied. Here, k and n are used in place of numbers that are positive integers excluding zero, and may be equal to each other.

The display pixel SP may include a light-emitting unit (e.g., a light-emitting element) ELU and a pixel driving unit (e.g., a pixel driving circuit) DDU. The light-emitting unit ELU may include a light-emitting element LEL. The pixel driving unit DDU may include a driving transistor DT, switch elements, and a capacitor CST1. The switch elements include first to sixth transistors ST1, ST2, ST3, ST4, ST5, and ST6.

The driving transistor DT may include a gate electrode, a first electrode, and a second electrode. A drain-source current Ids (hereinafter referred to as "driving current") of driving transistor DT flowing between the first electrode and the second electrode is controlled according to a data voltage applied to the gate electrode. The driving current Ids flowing through the channel of the driving transistor DT is proportional to the square of the difference between a voltage Vgs between the first electrode and the gate electrode of the driving transistor DT and a threshold voltage, as defined by Equation 1.

$$Ids = k' \times (Vsg - Vth)^2 \quad \text{Equation 1}$$

In Equation 1, k' denotes a proportional coefficient determined by a structure and physical properties of the driving transistor, Vsg denotes the voltage between the first electrode and the gate electrode of the driving transistor, and Vth denotes the threshold voltage of the driving transistor.

The light-emitting element LEL emits light as the driving current Ids flows therein. The amount of the light emitted from the light-emitting element LEL may increase with the driving current Ids.

The light-emitting element LEL may be an organic light-emitting diode including an organic emissive layer disposed between an anode electrode and a cathode electrode. As another example, the light-emitting element LEL may be an inorganic light-emitting element including an inorganic semiconductor disposed between an anode electrode and a cathode electrode. As another example, the light-emitting element LEL may be quantum-dot light-emitting element including a quantum-dot emissive layer disposed between an anode electrode and a cathode electrode. As another example, the light-emitting element LEL may be a micro light-emitting element including a micro light-emitting diode disposed between an anode electrode and a cathode electrode.

The anode electrode of the light-emitting element LEL may be connected to the first electrode of the fourth transistor ST4 and the second electrode of the sixth transistor ST6, while the cathode electrode thereof may be connected to the second supply voltage line VSL. A parasitic capacitance Cel may be formed between the anode electrode and the cathode electrode of the light-emitting element LEL.

The first transistor ST1 is turned on by an initialization scan initialization signal of the $k^{th}$ display initialization line GILk to connect the gate electrode of the driving transistor DT with the third supply voltage line VIL. Accordingly, a third supply voltage VINT of the third supply voltage line VIL may be applied to the gate electrode of the driving transistor DT. The gate electrode of the first transistor ST1 may be connected to the $k^{th}$ display initialization line GILk, the first electrode thereof may be connected to the gate electrode of the driving transistor DT, and the second electrode thereof may be connected to the third supply voltage line VIL.

The second transistor ST2 is turned on by the display scan signal of the $k^{th}$ display scan line GLk to connect the first electrode of the driving transistor DT with the data line DL. Accordingly, the data voltage of the data line DL may be applied to the first electrode of the driving transistor DT. The gate electrode of the second transistor ST2 may be connected to the $k^{th}$ display scan line GLK, a first electrode thereof may be connected to the first electrode of the driving transistor DT, and a second electrode thereof may be connected to the data line DL.

The third transistor ST3 is turned on by the display scan signal of the $k^{th}$ display scan line GLK to connect the gate electrode with the second electrode of the driving transistor DT. When the gate electrode and the second electrode of the driving transistor DT are connected with each other, the driving transistor DT works as a diode (e.g., the driving transistor DT may be diode-connected). A gate electrode of the third transistor ST3 may be connected to the $k^{th}$ display scan line GLK, a first electrode thereof may be connected to the second electrode of the driving transistor DT, and a second electrode thereof may be connected to the gate electrode of the driving transistor DT.

The fourth transistor ST4 is turned on by a display control signal of the $k^{th}$ display control line GCLk to connect the anode electrode of the light-emitting element LEL with the third supply voltage line VIL. The third supply voltage of the third supply voltage line VIL may be applied to the anode electrode of the light-emitting element LEL. The gate electrode of the fourth transistor ST4 may be connected to the $k^{th}$ display control line GCLK, the first electrode thereof may be connected to the anode electrode of the light-emitting element LEL, and the second electrode thereof may be connected to the third supply voltage line VIL.

The fifth transistor ST5 is turned on by the emission signal of a $k^{th}$ emission control line VLK to connect the first electrode of the driving transistor DT with the first supply voltage line VDL. The gate electrode of the fifth transistor ST5 is connected to the $k^{th}$ emission control line VLK, the first electrode thereof is connected to the first supply voltage line VDL, and the second electrode thereof is connected to the first electrode of the driving transistor DT.

The sixth transistor ST6 is disposed between the second electrode of the driving transistor DT and the anode electrode of the light-emitting element LEL. The sixth transistor ST6 is turned on by the emission control signal of the $k^{th}$ emission control line VLK to connect the second electrode of the driving transistor DT with the anode electrode of the light-emitting element LEL. The gate electrode of the sixth transistor ST6 is connected to the $k^{th}$ emission control line VLK, the first electrode thereof is connected to the second electrode of the driving transistor DT, and the second electrode thereof is connected to the anode electrode of the light-emitting element LEL.

When both the fifth transistor ST5 and the sixth transistor ST6 are turned on, the driving current Ids of the driving transistor DT according to the data voltage applied the gate electrode of the driving transistor DT may flow to the light-emitting element LEL.

The capacitor CST1 is formed between the gate electrode of the driving transistor DT and the first supply voltage line VDL. The first capacitor electrode of the capacitor CST1 may be connected to the gate electrode of the driving transistor DT, and the second capacitor electrode thereof may be connected to the first driving voltage line VDL.

When the first electrode of each of the first to sixth transistors ST1, ST2, ST3, ST4, ST5, and ST6 and the driving transistor DT is a source electrode, the second electrode thereof may be a drain electrode. As another example, when the first electrode of each of the first to sixth transistors ST1, ST2, ST3, ST4, ST5, and ST6 and the driving transistor DT is a drain electrode, the second electrode thereof may be a source electrode.

The active layer of each of the first to sixth transistors ST1, ST2, ST3, ST4, ST5, and ST6 and the driving transistor DT may include (e.g., may be made of) one of poly silicon, amorphous silicon, or an oxide semiconductor. Although the first to sixth transistors ST1, ST2, ST3, ST4, ST5, and ST6 and the driving transistor DT are illustrated as being implemented as p-type metal oxide semiconductor field effect transistors (MOSFETs) in FIG. 7, the present disclosure is not limited thereto. They may be implemented as n-type MOSFETs. For example, the first to sixth transistors ST1, ST2, ST3, ST4, ST5, and ST6, and the driving transistor DT may be implemented as n-type MOSFETs. As another example, at least one of the first to sixth transistors ST1, ST2, ST3, ST4, ST5, or ST6 may be implemented as an n-type MOSFET.

The light-sensing pixel LSP may be electrically connected to the $n^{th}$ sensing reset line RELn, the $n^{th}$ light-sensing scan line FSLn, and the $n^{th}$ light-sensing line RLn. The light-sensing pixel LSP may be reset by a reset signal from the $n^{th}$ sensing reset line RELn, and may transmit a light-sensing signal to the $n^{th}$ light-sensing line RLn in response to the sensing scan signal from the $n^{th}$ light-sensing scan line FSLn.

Each of the light-sensing pixels LSP may include (e.g., may be divided into) a photo-detecting unit (e.g., a photo-detecting element) PDU including first and second photo-detecting elements PD1 and PD2, and a detection driving unit (e.g., a detection driving circuit) FDU. The detection driving unit FDU may include first to third sensing transistors RT1 to RT3 and a sensing capacitor, and may control first and second light-sensing signals output from the first and second photo-detecting elements PD1 and PD2. The sensing capacitor may be formed in parallel with the photo-detecting elements PD.

The first sensing transistor RT1 of the detection driving unit FDU may change the amount of light-sensing current flowing in the first and second photo-detecting elements PD1 and PD2 of the photo-detecting unit PDU according to the voltage applied to the sensing capacitor. In other words, the amount of the light-sensing current flowing in the first and second photo-detecting elements PD1 and PD2 may vary depending on the voltage applied to the first and second photo-detecting elements PD1 and PD2, as well as to the sensing capacitor, and the amount of light incident on the first and second photo-detecting elements PD1 and PD2.

The gate electrode of the first sensing transistor RT1 may be connected to the second electrode of the first and second photo-detecting elements PD1 and PD2. A first electrode of the first sensing transistor RT1 may be connected to a common voltage source VCOM from which a common voltage is applied. A second electrode of the first sensing transistor RT1 may be connected to a first electrode of the second sensing transistor RT2.

The gate electrode of the second sensing transistor RT2 may be connected to the $n^{th}$ light-sensing scan line FSLn, the first electrode thereof may be connected to the second electrode of the first sensing transistor RT1, and the second electrode thereof may be connected to the $n^{th}$ light-sensing line RLn.

When the sensing scan signal of the gate-on voltage is applied to the $n^{th}$ light-sensing scan line FSLn, the second sensing transistor RT2 allows the sensing current of the first sensing transistor RT1 to flow to the $n^{th}$ light-sensing line RLn. In this case, the $n^{th}$ light-sensing line RLn may be charged with the sensing voltage by the sensing current.

When a reset signal of the gate-on voltage is applied to the $n^{th}$ sensing reset line RELn, the third sensing transistor RT3 may reset the voltages of the first and second photo-detecting elements PD1 and PD2 and the sensing capacitor to the reset voltage of a reset voltage source VRST. The gate electrode of the third sensing transistor RT3 may be connected to the sensing reset line RELn, the first electrode thereof may be connected to the reset voltage source VRST, and the second electrode thereof may be connected to the second electrode of each of the first and second photo-detecting elements PD1 and PD2.

The first and second photo-detecting elements PD1 and PD2 are connected in parallel with the first sensing transistor RT1 of the detection driving unit FDU and/or the like, and the first photo-detecting element PD1 is connected to the first light-sensing line ERL1, and the second photo-detecting element PD2 is connected to the second light-sensing line ERL2.

When the second sensing transistor RT2 is turned on by a sensing scan signal of the gate-on voltage, the first light-sensing signal of the first photo-detecting element PD1 is output on the first light-sensing line ERL1. In other words, the main driver circuit 200 receives first light-sensing signals from the light-sensing pixels LSP through the first light-sensing lines ERL1.

When the second sensing transistor RT2 is turned on by a sensing scan signal of the gate-on voltage, the second light-sensing signal of the second photo-detecting element PD2 is output on the second light-sensing line ERL2. In other words, the main driver circuit 200 receives second light-sensing signals from the light-sensing pixels LSP through the second light-sensing lines ERL2.

The main driver circuit 200 receives the first light-sensing signals from the light-sensing pixels LSP through the first light-sensing lines ERL1, and detects fingerprint recognition signals associated with changes in a magnitude of the first light-sensing signals.

The main driver circuit 200 receives the second light-sensing signals from the light-sensing pixels LSP through the second light-sensing lines ERL2, and detects photoplethysmography signals among biological signals associated with changes in a magnitude of the second light-sensing signals (e.g., pulse wave signals).

Although the first sensing transistor RT1 and the second sensing transistor RT2 are illustrated as being implemented as p-type metal oxide semiconductor field effect transistors (MOSFETs), while the third sensing transistor RT3 is implemented as an n-type MOSFET in the example shown in FIG. 7, the present disclosure is not limited thereto. As another example, they may be of the same type or different types. In addition, one of the first or second electrodes of each of the first sensing transistor RT1, the second sensing transistor RT2, and the third sensing transistor RT3 may be a source electrode, while the other one may be a drain electrode.

Figure 8:
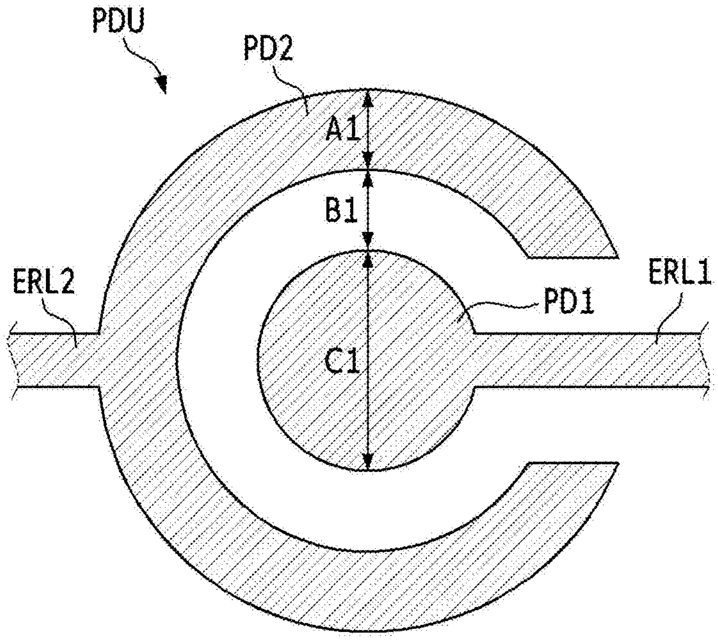
FIG. 8 is a plan view illustrating a layout of a light-sensing pixel according to a first embodiment of the present disclosure.

FIG. 8 is a plan view showing a layout of a light-sensing pixel according to a first embodiment of the present disclosure. In more detail, FIG. 8 is a view showing the shapes of the first and second photo-detecting elements shown in FIG. 7 in more detail when viewed from the top.

Referring to FIG. 8, a photo-detecting unit (e.g., a photo-detecting element) PDU of a light-sensing pixel LSP includes a first photo-detecting element PD1 electrically connected to a first light-sensing line ERL1, and a second photo-detecting element PD2 electrically connected to a second light-sensing line ERL2.

The first photo-detecting element PD1 is formed in a circular shape or a polygonal shape when viewed from the top (e.g., in a plan view), and outputs a first light-sensing signal corresponding to the amount of light incoming on the front side to the first light-sensing line ERL1.

The first photo-detecting element PD1 is formed in a circular shape or an oval shape when viewed from the top (e.g., in a plan view), and may be electrically connected to a separate detection driving unit (e.g., a separate detection driving circuit) FDU and the first light-sensing line ERL1 through at least one contact hole and the like. The first photo-detecting element PD1 outputs a first light-sensing signal corresponding to the amount of light incoming on the front side to the first light-sensing line ERL1 in response to a driving timing of the detection driving unit FDU.

The second photo-detecting element PD2 is formed in a circular shape or polygonal shape when viewed from the top (e.g., in a plan view) with a larger area than that of the first photo-detecting element PD1, and is formed in a shape that surrounds (e.g., around a periphery of) the first photo-detecting element PD1 so that the first photo-detecting element PD1 is disposed in an opening therein.

In more detail, the second photo-detecting element PD2 is formed in a circular shape or a polygonal shape when viewed from the top (e.g., in a plan view), and the opening having a shape conforming to the outer shape of the first photo-detecting element PD1 is formed in the center of the shape of the second photo-detecting element PD2 so that the first photo-detecting element PD1 is disposed in the opening.

The second photo-detecting element PD2 may further include an opened side of the opening where the first photo-detecting element PD1 is disposed. The first light-sensing line ERL1 electrically connected to the first photo-detecting element PD1 may be disposed at the opened side of the second photo-detecting element PD2.

The second photo-detecting element PD2 may have a larger area than that of the first photo-detecting element PD1. The second photo-detecting element PD2 outputs a second light-sensing signal corresponding to the amount of light incoming through the opening of the light-blocking pattern to the second light-sensing line ERL2 in response to a driving timing of the detection driving unit FDU.

The area of the opening at the center of the second photo-detecting element PD2 may be larger than the area of the first photo-detecting element PD1 when viewed from the top (e.g., in a plan view), and a width A1 or a thickness of the second photo-detecting element PD2 in at least one direction may be equal to or larger than a gap B1 between the first photo-detecting element PD1 and the second photo-detecting element PD2.

In addition, the width A1 or the thickness of the second photo-detecting element PD2 in the at least one direction may be narrower or smaller than a width C1 (e.g., or a diameter or a radius) of the first photo-detecting element PD1.

Figure 9:
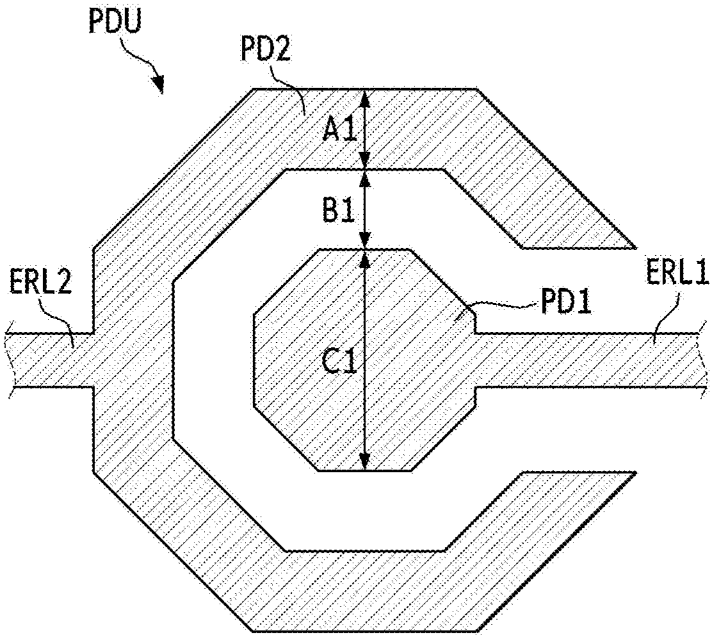
FIG. 9 is a plan view illustrating a layout of a light-sensing pixel according to a second embodiment of the present disclosure.

FIG. 9 is a plan view showing a layout of a light-sensing pixel according to a second embodiment of the present disclosure.

Referring to FIG. 9, the first photo-detecting element PD1 is formed in a polygonal shape, such as a rectangle, a hexagon, or an octagon, when viewed from the top (e.g., in a plan view), and outputs a first light-sensing signal corresponding to the amount of light incoming on the front side to the first light-sensing line ERL1.

For example, the first photo-detecting element PD1 may be formed in an octagon when viewed from the top (e.g., in a plan view), and may be electrically connected to a separate detection driving unit (e.g., a separate detection driving circuit) FDU and the first light-sensing line ERL1 through at least one contact hole and the like. The first photo-detecting element PD1 outputs a first light-sensing signal corresponding to the amount of light incoming on the front side to the first light-sensing line ERL1 in response to a driving timing of the detection driving unit FDU.

The second photo-detecting element PD2 is formed in a polygonal shape having a larger area than that of the first photo-detecting element PD1, such as a rectangle, a hexagon, or an octagon, when viewed from the top (e.g., in a plan view), and includes an opening at an inner center where the first photo-detecting element PD1 is disposed.

The opening formed at the inner center of the second photo-detecting element PD2 may be formed in a polygonal shape when viewed from the top (e.g., in a plan view), such as a rectangle, a hexagon, or an octagon, so that it conforms to the shape of the first photo-detecting element PD1 when viewed from the top (e.g., in a plan view). Accordingly, the second photo-detecting element PD2 is formed in a suitable shape that surrounds (e.g., around a periphery of) the first photo-detecting element PD1, so that the first photo-detecting element PD1 is disposed in the opening at the inner center.

The second photo-detecting element PD2 may further include an opened side of the opening where the first photo-detecting element PD1 is disposed. The first light-sensing line ERL1 electrically connected to the first photo-detecting element PD1 may be disposed at the opened side of the second photo-detecting element PD2.

The second photo-detecting element PD2 may have a larger area than that of the first photo-detecting element PD1. The second photo-detecting element PD2 outputs a second light-sensing signal corresponding to the amount of light incoming through the opening of the light-blocking pattern to the second light-sensing line ERL2 in response to a driving timing of the detection driving unit FDU.

The area of the opened side at the center of the second photo-detecting element PD2 may be larger than the area of the first photo-detecting element PD1 when viewed from the top (e.g., in a plan view), and a width A1 or a thickness of the second photo-detecting element PD2 in at least one direction may be equal to or greater (e.g., wider) than a gap B1 between the first photo-detecting element PD1 and the second photo-detecting element PD2.

In addition, the width A1 or the thickness of the second photo-detecting element PD2 in the at least one direction may be narrower or smaller than a width C1 (or a diameter or a radius) of the first photo-detecting element PD1.

Figure 10:
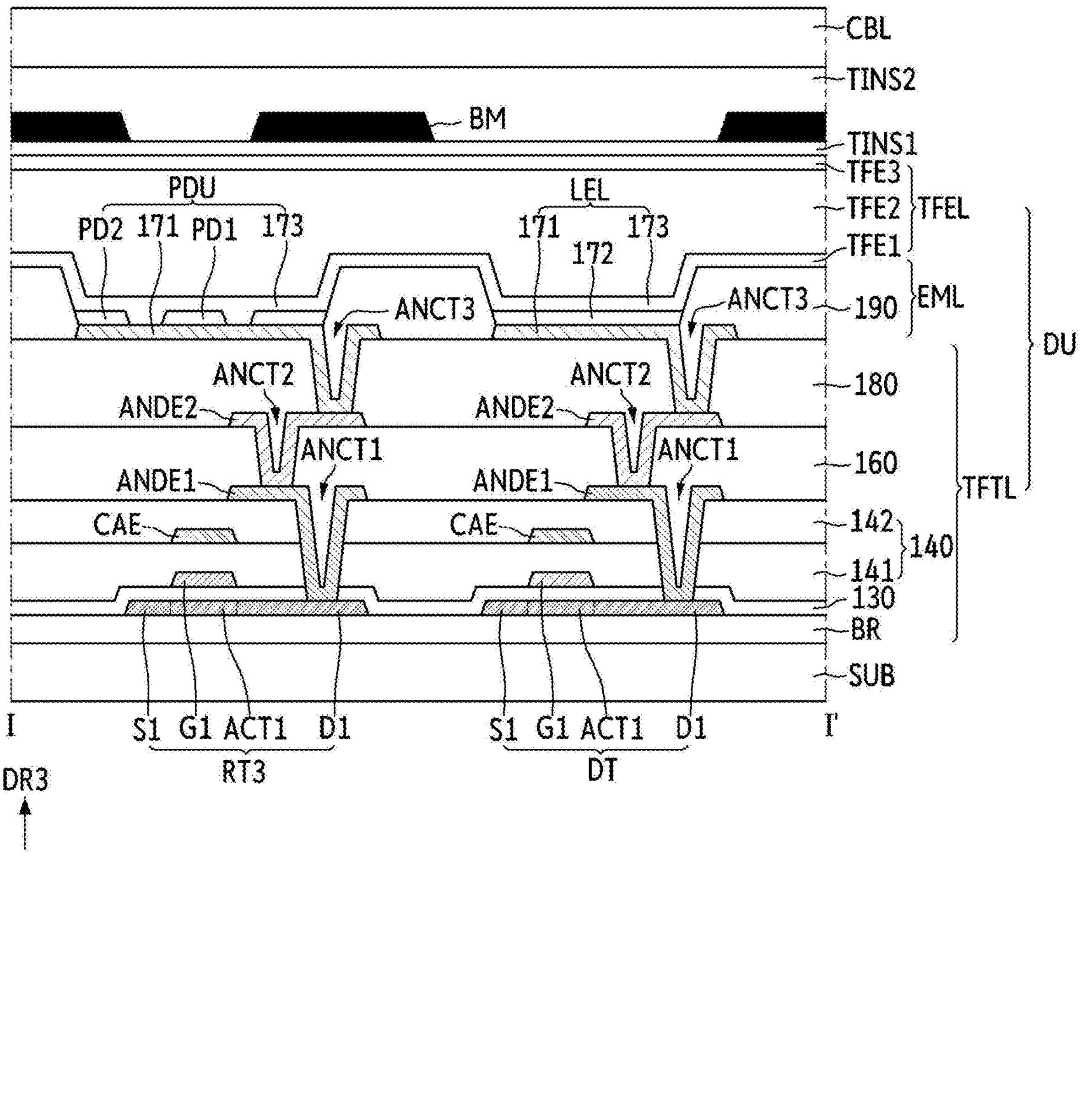
FIG. 10 is a cross-sectional view taken along the line I-I' of FIG. 6.
Figure 11:
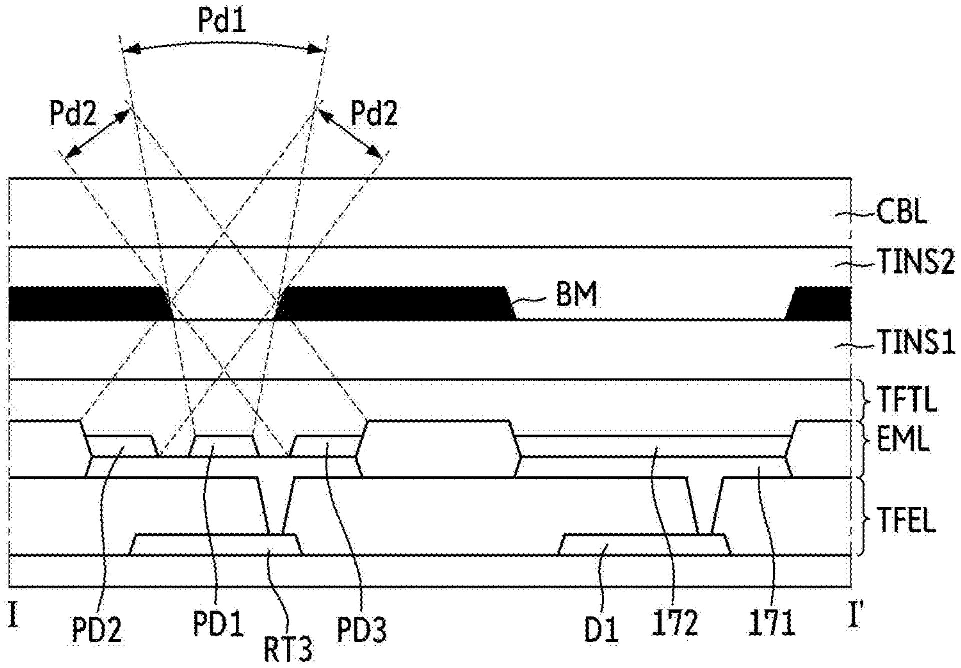
FIG. 11 is a cross-sectional view illustrating a simplified cross-sectional structure corresponding to the view of FIG. 10.

FIG. 10 is a cross-sectional view taken along the line I-I' of FIG. 6. FIG. 11 is a cross-sectional view illustrating a simplified cross-sectional structure corresponding to the view of FIG. 10.

Referring to FIGS. 10 and 11, a barrier layer BR may be disposed on the substrate SUB. The substrate SUB may include (e.g., may be made of) an insulating material such as a polymer resin. For example, the substrate SUB may include (e.g., may be made of) polyimide. The substrate SUB may be a flexible substrate that may be bent, folded, or rolled. The barrier layer BR is a film for protecting the thin-film transistors of the thin-film transistor layer TFTL and an emissive layer 172 of the emission material layer EML. The barrier layer BR may include (e.g., may be made up of) multiple inorganic layers alternately stacked on one another.

Thin-film transistors ST1 may be disposed on the barrier layer BR. Each of the thin-film transistors ST1 includes an active layer ACT1, a gate electrode G1, a source electrode S1, and a drain electrode D1.

A plurality of thin-film transistors RT3 and DT included in the pixel driving units DDU and the detection driving units FDU may be arranged on the barrier layer BR. Each of the thin-film transistors RT3 and DT includes an active layer ACT1, a gate electrode G1, a source electrode S1, and a drain electrode D1.

The active layer ACT1, the source electrode S1, and the drain electrode D1 of each of the thin-film transistors ST1 may be disposed on the barrier layer BR. A gate insulator 130 may be disposed on the active layer ACT1, the source electrode S1, and the drain electrode D1 of each of the thin-film transistors RT3 and DT. The gate electrode G1 of each of the thin-film transistors ST1 may be disposed on the gate insulator 130. The gate electrode G1 may overlap with the active layer ACT1 in the third direction (e.g., the z-axis direction).

A first interlayer dielectric layer 141 may be disposed on the gate electrode G1 of each of the thin-film transistors ST1. The first interlayer dielectric layer 141 may be formed of an inorganic layer, for example, such as a silicon nitride layer, a silicon oxynitride layer, a silicon oxide layer, a titanium oxide layer, or an aluminum oxide layer. The first interlayer dielectric layer 141 may include (e.g., may be made of) a plurality of inorganic layers.

A capacitor electrode CAE may be disposed on the first interlayer dielectric layer 141. The capacitor electrode CAE may overlap with the gate electrode G1 of the first thin-film transistor ST1 in the third direction (e.g., the z-axis direction). Because the first interlayer dielectric layer 141 has a predetermined dielectric constant, a capacitor may be formed by the capacitor electrode CAE, the gate electrode G1, and the first interlayer dielectric layer 141 disposed between them.

A second interlayer dielectric layer 142 may be disposed over the capacitor electrode CAE. A first anode connection electrode ANDE1 may be disposed on the second interlayer dielectric layer 142. The first anode connection electrode ANDE1 may be connected to the drain electrode D1 of the thin-film transistor ST1 through a first connection contact hole ANCT1 that penetrates the gate insulator 130, the first interlayer dielectric layer 141, and the second interlayer dielectric layer 142.

A first planarization layer 160 may be disposed over the first anode connection electrode ANDE1 for providing a flat surface over level differences due to the thin-film transistor ST1. The first planarization layer 160 may be formed of an organic layer, such as an epoxy resin, a polyamide resin, and/or a polyimide resin.

A second anode connection electrode ANDE2 may be disposed on the first planarization layer 160. The second anode connection electrode ANDE2 may be connected to the first anode connection electrode ANDE1 through a second connection contact hole ANCT2 penetrating the first planarization layer 160. A second planarization layer 180 may be disposed on the second anode connection electrode ANDE2.

On the second planarization layer 180, light-emitting elements LEL and photo-detecting units PDU including first and second photo-detecting elements PD1 and PD2 may be disposed. Each of the light-emitting elements LEL includes a pixel electrode 171, an emissive layer 172, and a common electrode 173. Each of the photo-detecting units PDU may include a pixel electrode 171, first and second photo-detecting elements PD1 and PD2, and the common electrode 173.

The pixel electrode 171 may be disposed on the second planarization layer 180. The pixel electrode 171 may be connected to the second anode connection electrode ANDE2 through a third connection contact hole ANCT3 penetrating the second planarization layer 180.

The bank 190 may partition the pixel electrode 171 on the second planarization layer 180 to define emission areas and light-sensing areas. The bank 190 may be disposed to cover the edges of the pixel electrode 171.

The common electrode 173 may be formed of a transparent conductive material (TCP), such as ITO and/or IZO, that may transmit light, or a semi-transmissive conductive material, such as magnesium (Mg), silver (Ag), and/or an alloy of magnesium (Mg) and silver (Ag).

An encapsulation layer TFEL may be disposed on the common electrode 173. The encapsulation layer TFEL includes at least one inorganic layer to prevent permeation of oxygen or moisture into the emission material layers EML and the photo-detecting units PDU. For example, the encapsulation layer TFEL may include first and second inorganic encapsulation layers TFE1 and TFE2.

The touch sensing unit TSU may be disposed on the encapsulation layer TFEL. The touch sensing unit TSU includes a first touch insulating layer TINS1 and a second touch insulating layer TINS2 where touch electrodes are formed.

A light-blocking pattern layer including a plurality of light-blocking patterns BM may be formed on the first touch insulating layer TINS1.

A color filter layer may be further formed on the touch sensing unit TSU, and a front cover layer CBL may be disposed on the front surface of the touch sensing unit TSU including the color filter layer.

The light-blocking patterns BM (e.g., a black matrix) of the light-blocking pattern layer formed on the first touch insulating layer TINS1 may be formed in a mesh structure that opens the front side of the light-emitting units ELU (e.g., light-emitting elements LEL) formed in the display pixels SP and the front side of the first photo-detecting elements PD1 formed in the photo-detecting units PDU of the light-sensing pixels LSP.

In more detail, the light-blocking patterns BM are formed to block light on the front side of the second photo-detecting elements PD2 formed in the photo-detecting units PDU of the light-sensing pixels LSP, including the area between the display pixels SP excluding the light-emitting units ELU of the display pixels SP. On the other hand, the light-blocking patterns BM may be formed in a mesh structure that opens the front side of the first photo-detecting elements PD1.

Referring to FIG. 11, the light-blocking patterns BM include openings in line with positions of the first photo-detecting elements PD1 on the front side among the first and second photo-detecting elements PD1 and PD2, and in the same shape as the shape of the first photo-detecting elements PD1 when viewed from the top (e.g., in a plan view). Accordingly, the light-blocking patterns BM block light on the front side of the second photo-detecting elements PD2, while transmitting light on the front side of the first photo-detecting elements PD1.

The openings of the light-blocking pattern BM formed on the front side of the first photo-detecting elements PD1 may be formed in a suitable shape conforming to the shape of the first photo-detecting elements PD1 when viewed from the top (e.g., in a plan view), and may have an area equal to or larger than the area of the first photo-detecting elements PD1 when viewed from the top (e.g., in a plan view).

The openings of the light-blocking pattern BM formed on the front side of the first photo-detecting elements PD1 may have an area smaller or narrower than the area of the openings formed at the inner center of the second photo-detecting elements PD2. Accordingly, the light-blocking patterns BM may block light on the front side of the second photo-detecting elements PD2, while transmitting light on the front side of the first photo-detecting elements PD1.

The first photo-detecting elements PD1 may receive light incident at a first angle pd1 on the front side through an opening of the light-blocking pattern BM opened on the front side, and may generate a first light-sensing signal corresponding to the amount of incident light. Accordingly, the main driver circuit 200 receives first light-sensing signals generated from the first photo-detecting elements PD1 of the light-sensing pixels LSP through the first light-sensing lines ERL1. The main driver circuit 200 generates fingerprint recognition signals corresponding to changes in the magnitude of the first light-sensing signals. The fingerprint recognition signals may be converted into image data using a suitable fingerprint detection algorithm (e.g., a predetermined fingerprint detection algorithm) and a fingerprint comparison program, and fingerprint authentication may be performed through a comparison algorithm of the image data.

On the other hand, the second photo-detecting elements PD2 may receive light incident at a second angle pd2 in at least one diagonal direction through an opening of the light-blocking pattern BM opened in the diagonal direction, and may generate a second light-sensing signal corresponding to the amount of incident light. Accordingly, the main driver circuit 200 receives second light-sensing signals generated from the second photo-detecting elements PD2 of the light-sensing pixels LSP through the second light-sensing lines ERL2. The main driver circuit 200 detects pulse signals corresponding to changes in the magnitude of the second light-sensing signals.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:
- a display panel having an image display area comprising image display pixels, infrared (IR) light-emitting pixels, and light-sensing pixels;
- a display scan driver configured to drive the image display pixels and the IR light-emitting pixels to emit light;
- a light-sensing scan driver configured to drive the light-sensing pixels to sense light; and
- a main driver circuit configured to receive first and second light-sensing signals through first and second light-sensing lines connected to the light-sensing pixels,
- wherein each of the light-sensing pixels comprises at least two photo-detecting elements spaced from each other,
- wherein the first and second light-sensing lines are configured to transmit the first and second light-sensing signals generated from the at least two photo-detecting elements,
- wherein the at least two photo-detecting elements comprise a first photo-detecting element and a second photo-detecting element, and
- wherein the second photo-detecting element has an opening at an inner center of the second photo-detecting element, and the first photo-detecting element is located in the opening while being spaced apart from the second photo-detecting element in a plan view.

2. The display device of claim 1, wherein the display panel comprises:
- a plurality of first pixel groups, each comprising first to fourth display pixels among the image display pixels;
- a plurality of second pixel groups, each comprising first to third display pixels among the image display pixels, and an IR light-emitting pixel among the IR light-emitting pixels; and
- a plurality of third pixel groups, each comprising first to third display pixels among the image display pixels, and a light-sensing pixel among the light-sensing pixels.

3. The display device of claim 2, wherein the IR light-emitting pixel comprises:
- an infrared light-emitting element configured to emit light in an infrared wavelength range; and
- an infrared pixel driver configured to apply a driving current to the infrared light-emitting element, and
- wherein the light-sensing pixel comprises:
  - the first and second photo-detecting elements as the at least two photo-detecting elements configured to detect light incident from a front side; and
  - a detection driver configured to apply a driving current to the first and second photo-detecting elements.

4. The display device of claim 2, wherein the light-sensing pixel comprises: the at least two photo-detecting elements configured to detect light incident from a front side; and
- a detection driver configured to control a light-sensing timing of the at least two photo-detecting elements,
- wherein
  - the first photo-detecting element is configured to generate the first light-sensing signal corresponding to an amount of light incident from the front side, and output the first light-sensing signal to the first light-sensing line; and
  - the second photo-detecting element is configured to generate the second light-sensing signal corresponding to an amount of light incident from the front side, and output the second light-sensing signal to the second light-sensing line.

5. The display device of claim 4, wherein the first photo-detecting element has a circular shape or a polygonal shape in a plan view, and is configured to output the first light-sensing signal corresponding to the amount of light incident from the front side to the first light-sensing line, and
- wherein the second photo-detecting element has a circular shape or a polygonal shape having a larger area than that of the first photo-detecting element in a plan view, and surrounds around the first photo-detecting element so that the first photo-detecting element is located in the opening at the inner center of the second photo-detecting element.

6. The display device of claim 5, wherein the second photo-detecting element further comprises an opened side of the opening at the inner center where the first photo-detecting element is located, and
- wherein the first light-sensing line electrically connected to the first photo-detecting element overlaps with the opened side of the second photo-detecting element.

7. The display device of claim 6, wherein an area of the opened side of the second photo-detecting element is larger than the area of the first photo-detecting element in a plan view,
- wherein a width or a thickness of the second photo-detecting element in at least one direction is equal to or greater than a gap between the first photo-detecting element and the second photo-detecting element, and
- wherein the width or the thickness of the second photo-detecting element in the at least one direction is narrower or smaller than a width, a diameter, or a radius of the first photo-detecting element.

8. The display device of claim 5, wherein the display panel further comprises a plurality of light-blocking patterns having a mesh structure, and
- wherein the mesh structure is opened to the front side of light-emitting elements of the image display pixels and the front side of first photo-detecting elements of the light-sensing pixels, and covers an area between the image display pixels and an area between the image display pixels and the light-sensing pixels.

9. The display device of claim 8, wherein the plurality of light-blocking patterns covers the front side of second photo-detecting elements of the light-sensing pixels, and has openings in line with front side positions of the first photo-detecting elements, the openings having a same shape as a shape of the first photo-detecting elements in a plan view, and wherein the openings have an area that is equal to or larger than an area of the first photo-detecting elements in a plan view, and is smaller or narrower than an area of the opening at the inner centers of the second photo-detecting elements.

10. A display device comprising:

display pixels in a display area of a display panel;

infrared (IR) light-emitting pixels in the display area;

light-sensing pixels in the display area;

a display scan driver configured to drive the display pixels to emit light;

a light-sensing scan driver configured to drive the light-sensing pixels to sense light; and a main driver circuit configured to receive first and second light-sensing signals through first and second light-sensing lines connected to the light-sensing pixels, wherein each of the light-sensing pixels comprises at least two photo-detecting elements spaced from each other, and wherein the first and second light-sensing lines are configured to transmit the first and second light-sensing signals generated from the at least two photo-detecting elements, wherein the at least two photo-detecting elements comprise:

a first photo-detecting element electrically connected to the first light-sensing line; and a second photo-detecting element electrically connected to the second light-sensing line, wherein the display panel further comprises a plurality of light-blocking patterns having a mesh structure, and wherein the mesh structure is opened at a front side of light-emitting elements of the display pixels and a front side of the first photo-detecting elements of the light-sensing pixels, and covers an area between the display pixels and an area between the display pixels and the light-sensing pixels.

11. The display device of claim 10, wherein the first photo-detecting element has a circular shape or a polygonal shape in a plan view, and is configured to output the first light-sensing signal corresponding to an amount of light incident from a front side to the first light-sensing line, and wherein the second photo-detecting element has a circular shape or a polygonal shape having a larger area than that of the first photo-detecting element in a plan view, and surrounds around the first photo-detecting element so that the first photo-detecting element is located in an opening at an inner center of the second photo-detecting element.

12. The display device of claim 11, wherein the second photo-detecting element further comprises an opened side of the opening at the inner center where the first photo-detecting element is located, and wherein the first light-sensing line electrically connected to the first photo-detecting element overlaps with the opened side of the second photo-detecting element.

13. The display device of claim 12, wherein an area of the opened side of the second photo-detecting element is larger than the area of the first photo-detecting element in a plan view, wherein a width or a thickness of the second photo-detecting element in at least one direction is equal to or greater than a gap between the first photo-detecting element and the second photo-detecting element, and wherein the width or the thickness of the second photo-detecting element in the at least one direction is narrower or smaller than a width, a diameter, or a radius of the first photo-detecting element.

14. The display device of claim 10, wherein the plurality of light-blocking patterns covers a front side of the second photo-detecting elements of the light-sensing pixels, and has openings in line with front side positions of the first photo-detecting elements, the openings having a same shape as a shape of the first photo-detecting elements in a plan view, and wherein the openings have an area that is equal to or larger than an area of the first photo-detecting elements in a plan view, and is smaller or narrower than an area of an opening at an inner center of the second photo-detecting elements.

15. An electronic device including a display device, the display device comprising:

a display panel having an image display area comprising image display pixels, infrared (IR) light-emitting pixels, and light-sensing pixels;

a display scan driver configured to drive the image display pixels and the IR light-emitting pixels to emit light;

a light-sensing scan driver configured to drive the light-sensing pixels to sense light; and a main driver circuit configured to receive first and second light-sensing signals through first and second light-sensing lines connected to the light-sensing pixels, wherein each of the light-sensing pixels comprises at least two photo-detecting elements spaced from each other, wherein the first and second light-sensing lines are configured to transmit the first and second light-sensing signals generated from the at least two photo-detecting elements, wherein the at least two photo-detecting elements comprise a first photo-detecting element and a second photo-detecting element, and wherein the second photo-detecting element has an opening at an inner center of the second photo-detecting element, and the first photo-detecting element is located in the opening while being spaced apart from the second photo-detecting element in a plan view.

* * * * *